(12) United States Patent
Blumenthal

(10) Patent No.: US 11,922,396 B1
(45) Date of Patent: Mar. 5, 2024

(54) SENDING PAIRING AND PAYMENT INSTRUCTIONS TO DEVICES

(71) Applicant: Block, Inc., San Francisco, CA (US)

(72) Inventor: Justin Blumenthal, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/359,109

(22) Filed: Jun. 25, 2021

(51) Int. Cl.
    G06Q 20/32      (2012.01)
    G06Q 20/20      (2012.01)
    G06Q 20/38      (2012.01)
    H04W 12/50    (2021.01)

(52) U.S. Cl.
    CPC ......... *G06Q 20/3278* (2013.01); *G06Q 20/20* (2013.01); *G06Q 20/3223* (2013.01); *G06Q 20/3276* (2013.01); *G06Q 20/382* (2013.01); *H04W 12/50* (2021.01)

(58) Field of Classification Search
    CPC .................................................. G06Q 20/3278
    See application file for complete search history.

(56) References Cited

U.S. PATENT DOCUMENTS

| | | | |
|---|---|---|---|
| 9,530,128 B1 * | 12/2016 | Bekmann | G06Q 20/34 |
| 9,542,678 B1 | 1/2017 | Glashan et al. | |
| 9,864,424 B1 | 1/2018 | Templeton et al. | |
| 11,354,659 B1 | 6/2022 | Krueger et al. | |
| 11,501,281 B1 | 11/2022 | Maibach et al. | |
| 2015/0242663 A1 | 8/2015 | Babu et al. | |
| 2015/0324792 A1 | 11/2015 | Guise et al. | |
| 2016/0034887 A1 | 2/2016 | Lee | |
| 2016/0345123 A1 | 11/2016 | Lamba et al. | |
| 2017/0004475 A1 * | 1/2017 | White | G06Q 20/3567 |
| 2017/0286943 A1 | 10/2017 | Glashan et al. | |
| 2018/0096329 A1 | 4/2018 | Hamilton et al. | |
| 2020/0250652 A1 * | 8/2020 | Xie | G06Q 30/04 |
| 2021/0073766 A1 * | 3/2021 | Gonzales | G06Q 20/3276 |
| 2021/0173945 A1 | 6/2021 | Karr et al. | |

OTHER PUBLICATIONS

Notice of Allowance dated Jul. 18, 2022, for U.S. Appl. No. 17/358,906, of Matthew, M., et al., filed Jun. 25, 2021.

* cited by examiner

*Primary Examiner* — Arunava Chakravarti
(74) *Attorney, Agent, or Firm* — Lee & Hayes P.C.

(57) ABSTRACT

Techniques described herein enable a payment service to generate and send different instructions regarding a wireless payment reader based on a current state of the payment reader. For instance, a wireless payment reader may include a quick-response (QR) code that uniquely identifies the payment reader relative to other payment readers. Further, the QR code may embed information identifying the wireless payment reader and/or a uniform resource locator (URL) pointing back to a payment service configured to process payment transactions with the wireless payment reader. In response to receiving an indication of a scan of the QR code, the payment service may determine whether the payment reader is currently paired. If not, then the payment service may generate and send pairing instructions to enable pairing with the payment reader. If so, then the payment service may generate and send payment instructions to cause the device to engage in a payment flow.

20 Claims, 17 Drawing Sheets

SENDING PAIRING AND PAYMENT INSTRUCTIONS TO DEVICES

TECHNICAL FIELD

In today's commerce, the process for completing transactions between customers and merchants continues to evolve. In some instances, transactions between customers and merchants may be facilitated through an application offered by a merchant. In addition to the above, the technology of payment instruments and payment channels used in these transactions have also advanced. This advancement in technology continues to expand the possibilities for connecting merchants and customers in commerce.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
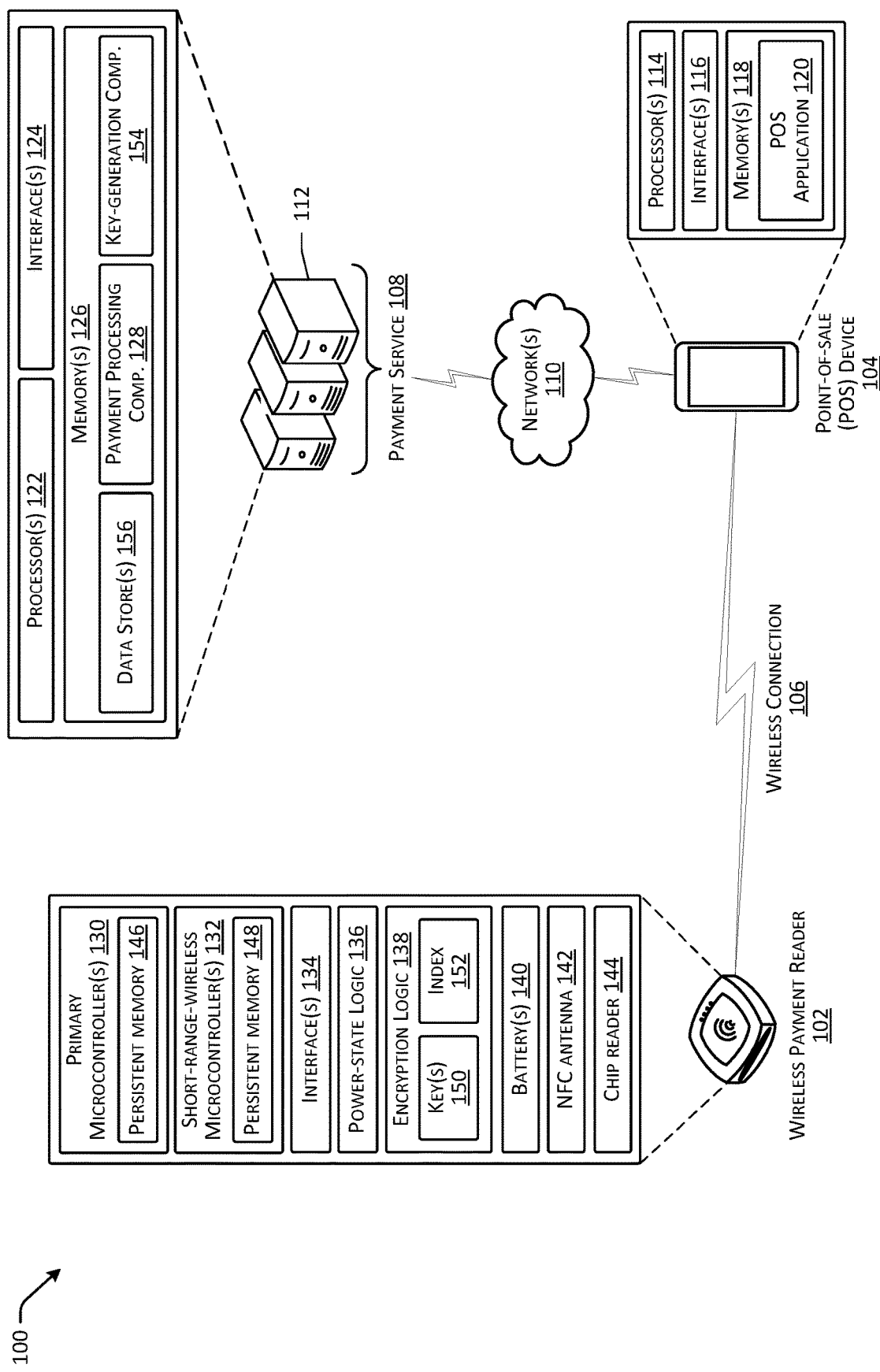
FIG. 1 illustrates an example environment that includes a point-of-sale (POS) device configured to interact with a wireless payment reader and a payment service in order to process payments for one or more transactions. In some instances, the wireless payment reader may be configured to transition between multiple different power states in order to lengthen a battery life of the wireless payment reader. In addition, the wireless payment reader may be configured to store, in persistent memory, information used for encrypting payment information, such that the wireless payment reader may transition between sleep and awake power states while still able to locally access this information upon wakeup.

Techniques described herein are directed to, among other things, wireless payment readers configured to transition between multiple different power states. In some instances, these power states include one or more relatively low-power states such that an overall battery life of the wireless payment readers are lengthened. Further, in some instances, a point-of-sale (POS) application operating on a POS device that wirelessly couples to an example wireless payment reader may cause the wireless payment reader to transition from one state to another, such as from a first, lower-power state to a second, higher-power state in response to the POS application determining that a payment is to be processed using the wireless payment reader.

To provide an example, a wireless payment reader as described herein may include functionality for accepting payment information from one or more payment instruments for settling respective payment transactions. For instance, the wireless payment reader may include a chip reader configured to read payment information from a payment card when the payment card is inserted into the reader. In addition, or in the alternative, the wireless payment reader may include a near-field-communication (NFC) reader configured to read payment information from a payment card in a contactless manner. In still other instances, the wireless payment reader may additionally or alternatively include a magnetic-stripe reader for reading payment information from a payment card that is swiped through the reader. Of course, while a few examples are described, it is to be appreciated that the wireless payment reader may be configured to receive and/or process payment information in any other manner.

Regardless of how the wireless payment reader receives the payment information, the wireless payment reader may encrypt and send the payment information to the POS device over any type of a network, such as wireless network (e.g., Bluetooth, Zigbee, WiFi, etc.) and/or any other type of network. In response to receiving the payment information, the POS device may send the payment information over the same or a different network to a remote server associated with a payment service, which may use the payment information to authorize the corresponding payment instrument and settle the cost of the transaction.

In addition to accepting payment information and communicating this information to the POS device for settling the cost of a transaction, the example wireless payment reader may include functionality for transitioning between different power states in order to minimize or otherwise lessen the amount of battery power used by the wireless payment reader and, thus, lengthen the battery life of the reader. For instance, and as described in greater detail below, an example wireless payment reader described herein may include multiple microcontrollers, one or more of which may be powered off during certain power states and powered on in other power states. For instance, an example wireless payment reader may include a primary microcontroller responsible for performing the functionality associated with receiving payment data, encrypting the payment data, and the like, as well as a short-range microcontroller (e.g., a Bluetooth microcontroller) responsible for communicating over one or more wireless networks and, in some instances, awakening the primary microcontroller at appropriate times.

To begin, an example wireless payment reader may be provide to a merchant in a fully-off power state. That is, each component of the wireless payment reader may be initially powered-off, including the primary microcontroller and the short-range-wireless microcontroller. Upon receiving an initial trigger, the wireless payment reader may enter a boot state, in which the components of the wireless payment reader begin powering on. For instance, both the primary microcontroller and the short-range-wireless microcontroller may be active during the boot state. In some instances, this initial trigger may comprise a user pressing a button on the wireless payment reader, plugging in the wireless payment reader to a power source or computing device, placing a radio-frequency (RF) device near the wireless payment reader to awaken the wireless payment reader via RF sense, and/or the like.

Upon receiving the initial trigger and after performing the boot process, the wireless payment reader may enter an "infrequent-advertising power state" in which the primary microcontroller is substantially or entirely disabled, while the short-range-wireless microcontroller is enabled but operating at a relatively low power. Further, during this power state, the wireless payment reader may periodically send, via the short-range-wireless microcontroller, an advertising message indicating that the wireless payment reader is currently not paired to a device. For instance, the wireless payment reader may send this advertising message every 100 milliseconds, 500 milliseconds, one second, and/or the like. Given that the primary microcontroller is inactive in this power state, but the short-range-wireless microcontroller is active in a low-power state in order to periodically send the advertising messages, the amount of power consumed in this power state is greater than when the wireless payment reader is in the fully-off state, but less than other more-active power states described below.

Upon receiving a request to pair with the wireless payment reader from another device, such as a POS device operating a POS application, the wireless payment reader may enter a pairing state during which time the wireless payment reader and the POS device attempt to pair with one another. During the pairing state, both the primary microcontroller and the short-range-wireless microcontroller may be in an active state as the wireless payment reader performs the pairing process with the POS device. If the pairing fails, the wireless payment reader may return to the infrequent-advertising mode. If the pairing succeeds, then the wireless payment reader may enter a paired state in which short-range-wireless microcontroller is enabled while the primary microcontroller is disabled, such as in a sleep state. After residing in the paired state for a relatively short amount of time, the wireless payment reader may transition to a connected-sleep state in which the short-range-wireless microcontroller is enabled, but in a relatively low-power state, while the primary microcontroller is disabled, such as turned off entirely. For instance, in the connected-sleep state, the short-range-wireless microcontroller may periodically send a check-in message to the paired POS device to ensure that the POS device is still proximate to the wireless payment reader. For instance, the short-range-wireless microcontroller may send a check-in message every 100 milliseconds, 500 milliseconds, one second, and/or the like. The primary microcontroller, meanwhile, may reside in a sleep state.

In some instances, the POS device may be moved to a location that is out of range of the wireless payment reader and, thus, the wireless payment reader might not receive a response to a check-in message for at least a first threshold amount of time, such as one minute, ten minutes, one hour, or the like. If no response to a check-in message is received within this first threshold amount of time, then the wireless payment reader may transition from the connected-sleep state to a disconnected-sleep state, in which the wireless payment reader remains paired to the device but sends the check-in messages even less frequently than when in the connected-sleep state. For instance, the short-range-wireless microcontroller may send a check-in message every one second or the like when in the disconnected-sleep state. Further, upon receiving a response to a check-in message from the POS device, the wireless payment reader may transition back to the connected-sleep state. If, however, the POS device does not respond to a check-in message within a second threshold amount of time, then the wireless payment reader may unpair from the POS device and transition back to the infrequent-advertising state.

While in the connected-sleep state, the wireless payment reader may receive an indication of an operation being performed on the POS devices that causes the wireless payment reader to transition from the connected-sleep state to a ready-for-payment state. For instance, the POS application may send, to the wireless payment reader, a "hint" indicating that the POS device may request payment information from the wireless payment reader relatively soon and, thus, that the wireless payment reader is to ready itself for reading the payment data from a payment instrument. In some instances, this payment hint may be sent in response to a merchant (or user) operating the POS application to add an item to a virtual cart, navigating to a certain menu or portion of the POS application, or the like. Further, while this example describes sending a payment hint to the wireless payment reader, in other instances the POS device may send data to awaken the wireless payment reader based on any other event, such as determining that a battery power of the wireless payment reader has reached a threshold level, determining that the wireless payment reader is to receive a firmware update, or the like.

Upon receiving the payment hint, the wireless payment reader may transition from the connected-sleep state to the ready-for-payment state. To do so, the short-range-wireless microcontroller may receive the payment hint and enable the primary microcontroller. At this point, however, a near-field-communication (NFC) antenna of the wireless payment reader may remain in an off state, as it has in each of the previously described states. Nevertheless, in the ready-for-payment state, both the primary microcontroller and the short-range-wireless microcontroller of the wireless payment reader may remain active and awaiting payment. In some instances, the wireless payment reader may set an internal time and, if the timer expires before receiving an indication from the POS device that a charge is to be initiated, the wireless payment reader may transition back to the connected-sleep sleep state.

Upon receiving an indication from the POS device that a charge has been initiated, however, the wireless payment reader may transition from the ready-for-payment state to a payment state. In the payment state, the primary microcontroller may activate the NFC antenna of the wireless payment reader in order to be prepared to receive payment via a contactless payment instrument (e.g., card, mobile device, etc.). Upon receiving payment information (e.g., from the NFC antenna, chip reader, magnetic stripe, or the like), the wireless payment reader may send, via the short-range-wireless microcontroller, encrypted payment data to the POS device, which may send this encrypted payment data to the payment service for authorizing the payment instrument associated with the payment information. After sending the encrypted data, the wireless payment reader may transition back to the connected-sleep state. Further, if the wireless payment reader does not successfully receive the payment information while in the payment state, the wireless payment reader may transition back to the connected-sleep state.

In some instances, the wireless payment reader may also transition from one or more of the above-mentioned states to a ready-for-shutdown state in response to a battery level of the wireless payment reader dropping below a threshold batter level. For instance, when the battery level drops below 15%, 10%, 5% or the like, the wireless payment reader may enter the prepare-for-shutdown state, in which the primary microcontroller is disabled (e.g., placed into a sleep mode) while the short-range-wireless microcontroller remains enabled. From this state, the wireless payment reader may transition to the fully-off state, where both the primary microcontroller and the short-range-wireless microcontroller are turned off.

As will be appreciated, the above-described wireless payment reader is therefore configured to transition between varying power states in order to lengthen a battery life of the wireless payment reader while still acquiring, encrypting, and sending along payment data when a charge occurs. Further, after being initially powered on via a button-push or the like, the wireless payment reader may transition from lower-power states to higher-power states based on data sent by a POS device paired to the wireless payment reader. That is, the wireless payment reader may reside in a low-power state, such as connected-sleep state, until receiving an indication from the POS device to prepare the wireless payment reader for payment. By enabling the short-range-wireless microcontroller in the connected-sleep state, and preparing the short-range-wireless microcontroller for receiving the payment hint from the POS device, the wireless payment reader is able to disable (e.g., turn off) the primary microcontroller while the wireless payment reader remains in the connected-sleep state. Thus, the wireless payment reader may extend its battery life while being prepared to "awaken" based on a notification from the POS application operating on the POS device paired to the wireless payment reader. In other words, the described techniques reduce the power consumed by the wireless payment reader between payment transactions, while not requiring a user to manually turn or otherwise awaken the wireless payment reader before utilizing the wireless payment reader for taking a payment.

In addition to the above, the techniques described herein enable the wireless payment reader to transition between the lower-power and higher-power states, as described, while still performing cryptographic operations (for securing the payment data) or other operations without undue latency caused by the transition between sleep and awake power states. For instance, and as described in further detail below, the wireless payment reader may store information associated with cryptographic operations performed by the wireless payment reader in persistent memory of the wireless payment reader so that this information may be retained when the wireless payment reader enters a low-power, sleep state. Thus, when the wireless payment reader awakens from the low-power state, the wireless payment reader may read the cryptographic information from the local persistent memory rather than needing to request this information from the payment service. A similar retention technique may be practiced by the wireless payment reader for other kinds of information besides cryptographic information.

To begin, the example wireless payment reader described herein may function to receive payment data from an example payment instrument, such as a credit card or the like, encrypt this payment information, and send this encrypted payment information, via a secure channel, to the payment service via the POS device. By encrypting the payment data and sending it via the secure channel, the techniques significantly reduce the possibility that underlying payment data could be compromised when in transit between the payment reader and the payment service. Further, when the encrypted payment data reaches the payment service, the payment service may decrypt the payment data and attempt to authorize the payment data for the cost of the corresponding transaction.

In order to create this secure channel and to enable the wireless payment reader to encrypt the payment data in a manner in which the payment service may decrypt the data, the wireless payment reader may initially be configured (e.g., at a time of manufacture) with cryptographic information (e.g., a shared secret) that is also known at the payment service. Thus, upon being powered on, the wireless payment reader may use the prestored cryptographic information to generate encrypted data and may send this encrypted data to the payment service via the POS device. Upon receiving the encrypted data via the POS device, the payment service may use the shared secret to verify the validity of the data and, thus, the wireless payment reader that encrypted and sent the data. In response to making this verification, the payment service may send instructions down to the wireless payment reader via the POS device for generating a set of cryptographic keys that will be known to both the wireless payment reader and the payment service.

Upon receiving these instructions, the wireless payment reader may generate the set of cryptographic keys, which may comprise a number of keys (e.g., 128) that may be used to establish a secure connection between the wireless payment reader and the payment service via the POS device and that may be used to encrypt payment data that is set along this secure connection. After generating the set of cryptographic keys, and/or after receiving an indication that a payment is going to occur at the POS device and via the wireless payment reader, the wireless payment reader may establish a first secure session between the wireless payment reader and the payment service using one or more first keys of the set of cryptographic keys. Thereafter, when the wireless payment reader receives payment data from a payment instrument, the wireless payment reader may encrypt this payment data using one or more second keys of the set of cryptographic keys and may send this encrypted data to the payment service via the first secure session. Upon receiving the encrypted payment data, the payment service may use its own copy of the one or more second keys, or corresponding cryptographic information, to decrypt the payment data and attempt to authorize a corresponding payment instrument using the payment instrument.

The wireless payment reader, meanwhile, may transition from a higher-power state (e.g., the "payment state") to a lower-power state (e.g., the "connected-sleep state") in response to sending the encrypted payment data via the first secure session. Before doing so, however, the wireless payment reader may cache an indication of an index associated with the set of cryptographic keys in persistent memory of the wireless payment reader, such as in persistent memory of the primary microcontroller, persistent memory of the short-range-wireless microcontroller, or persistent memory in another location of the wireless payment reader. That is, the wireless payment reader may store, in the persistent memory, an indication of a current location of the set of cryptographic keys (e.g., the set of 128 keys) at which the wireless payment reader should begin from to establish subsequent secure sessions, encrypt subsequent payment data, and the like. That is, given that the primary microcontroller is going to be disabled when the wireless payment reader transitions to the lower-power state (as described above), caching data indicating the next key to be used (and, potentially, the set or remaining set of the cryptographic keys) enables the wireless payment reader to pick up where it let off, rather than needing to re-generate a new set of (e.g., 128) cryptographic keys upon awakening from the lower-power state.

For instance, and as described above, the POS application executing on the POS device that is paired to the wireless payment reader may send a payment hint to the wireless payment reader while the wireless payment reader is in the connected-sleep state. Upon receiving this data, the short-range-wireless microcontroller of the wireless payment reader may awaken the primary microcontroller. Thereafter, the primary microcontroller and/or the short-range-wireless microcontroller may access the persistent memory to identify the current location (i.e., index) in the set of cryptographic keys, as well as potentially the cryptographic keys themselves.

In this example, the wireless payment reader may determine, from the data stored in the persistent memory, that the wireless payment reader is to pick up using one or more third keys of the set of cryptographic keys. The wireless payment reader may thus establish a second secure session with the payment service via the POS device using the one or more third keys and, thereafter, may use one or more fourth keys when encrypting payment data associated with the current payment transaction. Thus, by caching the index information and, potentially the key information, the latency associated with generating a secure session between the wireless payment reader and the payment service and with encrypting payment data and sending that encrypted payment data to the payment service is greatly reduced. For example, absent the described techniques, the wireless payment reader may be required to again navigate the challenge and handshake process with the payment service prior to generating subsequent secure sessions. Further, the wireless payment reader may continue to store the index and/or key information in the persistent memory each time the wireless payment reader prepares to enter a lower-power mode where the primary microcontroller is disabled. Doing so may reduce the latency associated with generating subsequent secure sessions, until the wireless payment reader exhausts the current set of cryptographic keys and a new set is to be generated in communication with the payment service.

In addition to the above, the techniques described herein may enable a payment service to generate and send different instructions regarding a wireless payment reader based on a current state of the payment reader. For instance, and as described in detail below, a wireless payment reader may include visual indicia printed thereon, such as a quick-response (QR) code, that uniquely identifies the payment reader relative to other payment readers. Further, the QR code (or other indicia) may embed information identifying the wireless payment reader and/or a uniform resource locator (URL) pointing back to a payment service configured to process payment transactions with the wireless payment reader.

In some instances, users may use their respective devices (e.g., their cameras) to scan the QR code. In response, each user device may identify the QR code (or other visual indicia), identify the URL embedded therein, and send an indication of the scan to the identified URL. The payment service may receive an indication of the scan and, based on a current state of the payment reader, may determine whether to generate and send pairing instructions to cause the device to pair to the payment reader or payment instructions to cause the device to output data for engaging in a payment flow using the device.

For instance, upon a first device scanning the QR code and sending an indication of the scan, the payment service may first identify the payment reader and determine that the payment reader is currently unpaired. In response, the payment service may generate pairing instructions and may send these pairing instructions to the first device. Upon receiving the pairing instructions, the first device may execute the instructions, which may cause the first device to pair over a short-range wireless network with the payment reader. The first device, and a POS application stored thereon, may thereafter use the payment reader for accepting payments to settle costs associated with a transaction with a customer.

Thereafter, however, a second device may scan the QR code and send an indication of the scan to the payment service. Upon receiving the indication of the scan, the payment service may again identify the payment reader. In this example, however, the payment service may determine that the payment reader is already paired to the payment and, in response, generate and output payment instructions rather than pairing instructions. That is, the payment service may generate instructions to enable a user of the customer device to engage in a payment flow to settle a cost of a transaction. In some instances, the payment service may also be configured to determine, based on the indication of the scan, whether the customer device stores an application associated with (e.g., provided by) the payment service. If not, the payment service may also generate and send installation instructions to cause the customer device to acquire and install the application associated with the payment service, which may be used for engaging in the payment flow with the POS device via the payment reader.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example environment 100 in which a wireless payment reader 102 couples to a point-of-sale (POS) device 104 over a wireless connection 106, such as a short-range-wireless connection (e.g., Bluetooth, Zigbee, etc.) or otherwise. In addition, the POS device 104 couples with a payment service 108 over one or more networks 110, which may comprise any combination of wired and/or wireless networks. As illustrated, the payment service 108 may comprise one or more servers 112 that are remote from an environment of the POS device 104 and the wireless payment reader 102, which may comprise a merchant environment.

In some instances, a merchant or other user may operate the POS device 104 in combination with the wireless payment reader 102 to process payment transactions. For instance, in response to a customer of a merchant requesting to acquire an item, the merchant may operate the POS device 104 to generate transaction information associated with the transaction, such as the cost of the item, and the like. In some instances, the POS device 104 may instruct the wireless payment reader 102 to prepare to acquire payment data and, in response, the wireless payment reader may prepare to receive payment data via a contactless payment card, a chip reader, a magnetic-stripe reader, or the like. For instance, the customer may insert a payment card into a chip reader portion of the wireless payment reader 102 and, in response, the wireless payment reader 102 may generate and encrypt payment data associated with this payment card. The wireless payment reader 102 may then send, to the POS device and via a secure session established between the wireless payment reader 102 and the payment service 108, the encrypted payment data. Upon receiving the encrypted payment data, the POS device 104 may send it along the secure session to the payment service 108, which may receive the encrypted payment data, decrypt the data, and attempt to authorize the underlying payment instrument for the cost of the transaction.

In some instances described below, the wireless payment reader 102 may be configured to transition between lower-power and higher-power states to lengthen a battery life of the reader, while enabling the POS device 104 to cause the reader to transition from a lower-power state to a higher-power state automatically and without a user interacting directly with the wireless payment reader 102. In addition, the wireless payment reader 102 may be configured to persistently store cryptographic-operation information locally to reduce the latency associated with performing cryptographic operations after transitioning from a lower-power state to a higher-power state.

As illustrated, the POS device 104 may comprise one or more processors 114, one or more network interfaces 116, and memory 118, which may store a POS application 120. The POS application 120 may comprise any locally or remotely stored functionality for enabling transactions between one or more users. In addition, the POS application 120 may communicate with the wireless payment reader 102 over the wireless connection 106 to send instructions to the wireless payment reader 102 and to receive information from the wireless payment reader 102, such as encrypted payment data.

The remote servers 112 of the payment service 108, meanwhile, may comprise one or more processors 122, one or more network interfaces 124, and memory 126, which may store a payment-processing component 128, a key-generation component 154, and one or more data stores 156. In some instances, the payment-processing component 128 may receive the encrypted payment data from the POS application 120 and, in response, may decrypt the payment data before sending the payment data to one or more other payment servers for attempting to authorize the payment data for the cost of a transaction. The key-generation component 154, meanwhile, may generate one or more keys for establishing a secure session with the wireless payment reader 102 via the POS device 104, and for decrypting payment data received from the wireless payment reader 102 via the secure sessions. The operation of the key-generation component 154 is discussed in further detail with reference to FIGS. 4A-B. The data stores 156 may store these keys, as well as received payment data and other types of data generated or received by the payment service 108.

The wireless payment reader 102, meanwhile, may include a primary microcontroller 130, a short-range-wireless microcontroller 132, one or more network interfaces 134, power-state logic 136, encryption logic 138, a battery 140, a near-field-communication (NFC) antenna 142, and a chip reader 144. As will be appreciated, each described microcontroller may include one or more processors and memory, at least a portion of which may comprise persistent memory, such as persistent memory 148 and persistent memory 146. Further, it is noted that while FIG. 1 illustrates the NFC antenna 142 as a separate component, in some instances the NFC antenna 142 and the short-range-wireless microcontroller 132 may reside on a common printed circuit board (PCB). Further, in some instances, the primary microcontroller 130 may include logic for performing traditional payment functionality of the wireless payment reader 102, such as reading payment data from the chip reader 144 or the NFC antenna 142 and sending the payment data to the POS device 104 for sending to the payment service 108.

In addition, and as illustrated, the wireless payment reader 102 may include the power-state logic 136 and the encryption logic 138. In some instances, the described logic may comprise computer-executable instructions stored in memory of one or more of the microcontrollers, while in other instances the logic may execute as firmware as a system on a chip (SOC). Further, while the power-state logic 136 and encryption logic 138 are illustrated as components separate from other components of the wireless payment reader 102, it is to be appreciate that one or both of these logic may reside as part of other components of the wireless payment reader 102. For example, in some instances the power-state logic 136 may reside on and be executed by the short-range-wireless microcontroller 132, while the encryption logic 138 may reside on and be executed by the primary microcontroller 130.

Regardless of the location of the power-state logic 136, this logic may function to cause the wireless payment reader 102 to transition between varying power states based on different factors and/or triggers. For instance, the power-state logic 136 may be configured to execute operations discussed below with reference to FIGS. 2A-B in order to transition the wireless payment reader 102 between the different power states illustrated in FIG. 3. In addition, the power-state logic 136 may be configured to perform the operations illustrated in FIGS. 5A-C. These operations and power states will be described in detail below.

The encryption logic 138, meanwhile, may function to perform cryptographic operations in a manner that both encrypts and secures communications between the wireless payment reader 102 and the payment service 108 and lessens the latency for doing so as compared to previous techniques. For instance, the encryption logic 138 may generate a set of cryptographic keys 150, which may be used in an order defined by an index 152, and may use these keys 150 to establish secure sessions with the payment service 108 and to encrypt payment data sent along these secure sessions. In some instances, the encryption logic 138 may perform the operations discussed below with reference to FIGS. 4A-B, as well as FIGS. 6A-B, which are discussed in detail below.

Figure 2A:
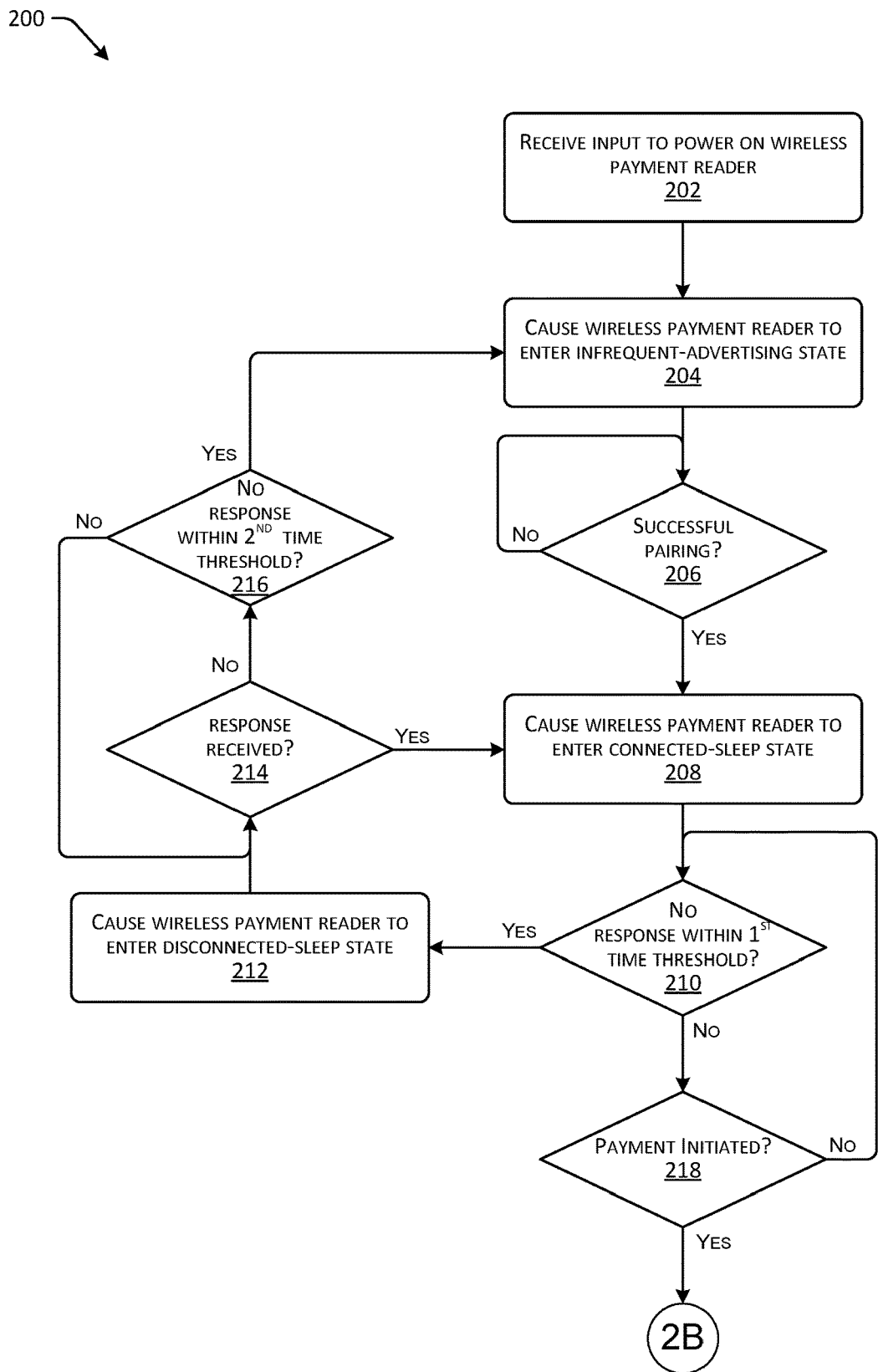
FIGS. 2A-B collectively illustrate an example flow diagram of a process for causing a wireless payment reader to transition between different power states in order to increase a life of a battery of the wireless payment reader.
Figure 2B:
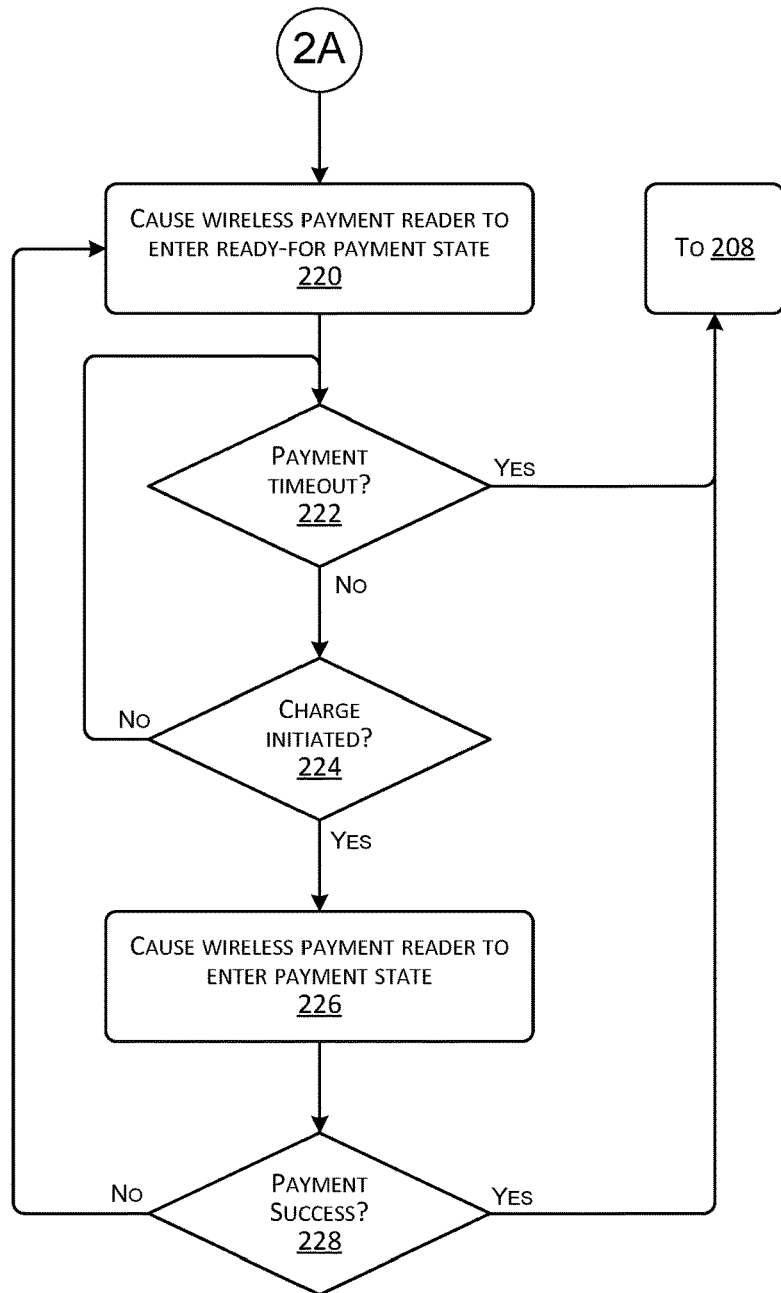

FIGS. 2A-B collectively illustrate an example flow diagram of a process 200 for causing the wireless payment reader 102 to transition between different power states in order to increase a life of the battery 140 of the wireless payment reader 102. As described above, in some instances the power-state logic 136 may perform some or all of the operations of the process 200.

The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The order in which the operations or steps are described is not intended to be construed as a limitation, and any number of the described operations may be combined in any order and/or in parallel to implement the described processes.

At an operation 202, an input to power on the wireless payment reader may be received. For instance, this input may comprise a user pressing a button on the wireless payment reader, plugging in the wireless payment reader to a power source or computing device, placing a radio-frequency (RF) device near the wireless payment reader to awaken the wireless payment reader via RF sense, and/or the like.

At an operation 204, after the wireless payment reader 102 goes through a boot process, the power-state logic 136 may cause the wireless payment reader 102 to enter an infrequent-advertising state. In the infrequent-advertising state, the wireless payment reader 102 may periodically broadcast (e.g., via the short-range-wireless microcontroller 132) an advertising message indicating that the wireless payment reader 102 is currently unpaired. In some instances, the wireless payment reader 102 may broadcast an instance of this advertising message at a relative infrequent basis, such as once a second. It is further noted that while in the infrequent-advertising state, the primary microcontroller 130 and the NFC antenna 142 may be in an off state, while the short-range-wireless microcontroller 132 may be consuming little power, given that it is broadcasting a single advertising message at a low frequency.

At an operation 206, the power-state logic 136 determines whether a successful pairing between the wireless payment reader 102 and another device, such as the POS device 104, has occurred. If not, then the wireless payment reader 102 continues to infrequently broadcast advertising messages until the wireless payment reader 102 pairs to another device.

At an operation 208, and after a successful pairing, the power-state logic 136 cause the wireless payment reader 102 to enter a connected-sleep state. In the connected-sleep state, the wireless payment reader 102 is paired to another device, such as the POS device 104, and periodically sends a check-in message to the POS device 104 via the short-range-wireless microcontroller 132. In some instances, this message may be infrequent like the advertising message, with a periodicity of one second or the like. Like the infrequent-advertising state, the primary microcontroller 130 and the NFC antenna 142 may be in an off state while the wireless payment reader 102 is in the connected-sleep state, while the short-range-wireless microcontroller 132 may be consuming little power, given that it is broadcasting a single check-in message at a low frequency.

At an operation 210, the power-state logic 136 determines whether the POS device 104 has failed to respond to a check-in message for a first threshold amount of time, such as one minute, five minutes, one hour, or the like. If so, then at an operation 212 the power-state logic 136 causes the wireless payment reader 102 to enter a disconnected-sleep state. In the disconnected-sleep state, the wireless payment reader 102 may remain paired to the POS device 104 but may send the check-in messages even less frequently than when in the connected-sleep state. For instance, the short-range-wireless microcontroller 132 may send a check-in messages every one second or more when in the disconnected-sleep state. Again, the primary microcontroller 130 and the NFC antenna 142 may be in an off state while the wireless payment reader 102 is in the disconnected-sleep state, while the short-range-wireless microcontroller 132 may be consuming little power, given that it is broadcasting a single check-in message at a low frequency.

At an operation 214, the power-state logic 136 determines whether a response from the paired device (e.g., the POS device 104) has been received. If a response is received, then the power-state logic 136 may cause the wireless payment reader 102 to return to the connected-sleep state. If not, an operation 216 represents determining whether a response has been received within a second threshold amount of time, which may be more, less or the same as the first threshold amount of time. If no response has been received within the second threshold amount of time, then the power-state logic 136 may cause the wireless payment reader 102 to return to the infrequent-advertising state.

Returning to the operation 210, if a response to a check-in message has been received within the first threshold amount of time, then an operation 218 represents determining whether a payment has been initiated. If not, then the process 200 returns to the operation 210. If so, however, then the process 200 proceeds to FIG. 2B. In some instances, receiving an indication that a payment has been initiated comprises receiving, from the POS device 104, the indication in response to an item being placed in a virtual cart of the POS application executing on the POS device 104.

FIG. 2B continues the illustration of the process 200 and includes, at an operation 220, the power-state logic 136 causing the wireless payment reader 102 to enter a ready-for-payment state. In some instances, the short-range-wireless microcontroller 132 wakes up, or enables, the primary microcontroller 130 in order to transition to the ready-for-payment state. Thus, in this state, both microcontrollers may be active, although the NFC antenna 142 may remain disabled.

An operation 222 represents determining whether a payment timeout has occurred. That is, the power-state logic 136 may determine whether no payment has been received, or no charge has been initiated with a certain amount of time after transitioning the wireless payment reader 102 to the ready-for-payment state. If a timeout has occurred, then the process 200 may proceed back to the operation 208, meaning that the power-state logic 136 may transition back to the connected-sleep state.

If no timeout occurs, then an operation 224 represents determining whether a charge has been initiated. That is, this operation represents the power-state logic 136 determining whether the POS application 120 has sent a request to prepare to accept payment at the wireless payment reader 102 (e.g., via the chip reader 144, NFC antenna 142, or so forth). If this request has not been received, then FIG. 2B illustrates that the process 200 either awaits this request or a payment timeout. If, however, this request is received, then an operation 226 represents the power-state logic 136 causing the wireless payment reader 102 to transition to a payment state, which may comprise the power-state logic 136 awakening, or turning on, the NFC antenna to prepare for a potential payment via a contactless card, mobile device, or the like.

An operation 228 represents determining whether the wireless payment reader 102 has successfully read payment data from a payment instrument—that is, whether payment has been successfully taken at the wireless payment reader 102. If not, the power-state logic 136 causes the wireless payment reader 102 to return to the ready-for-payment state. If so, then the wireless payment reader 102 encrypts the payment data and sends the encrypted payment data to the POS device over the wireless connection 106. In addition, the power-state logic 136 causes the wireless payment reader 102 to transition back to the connected-sleep state by disabling the NFC antenna 142 and the primary microcontroller 130.

Figure 3:
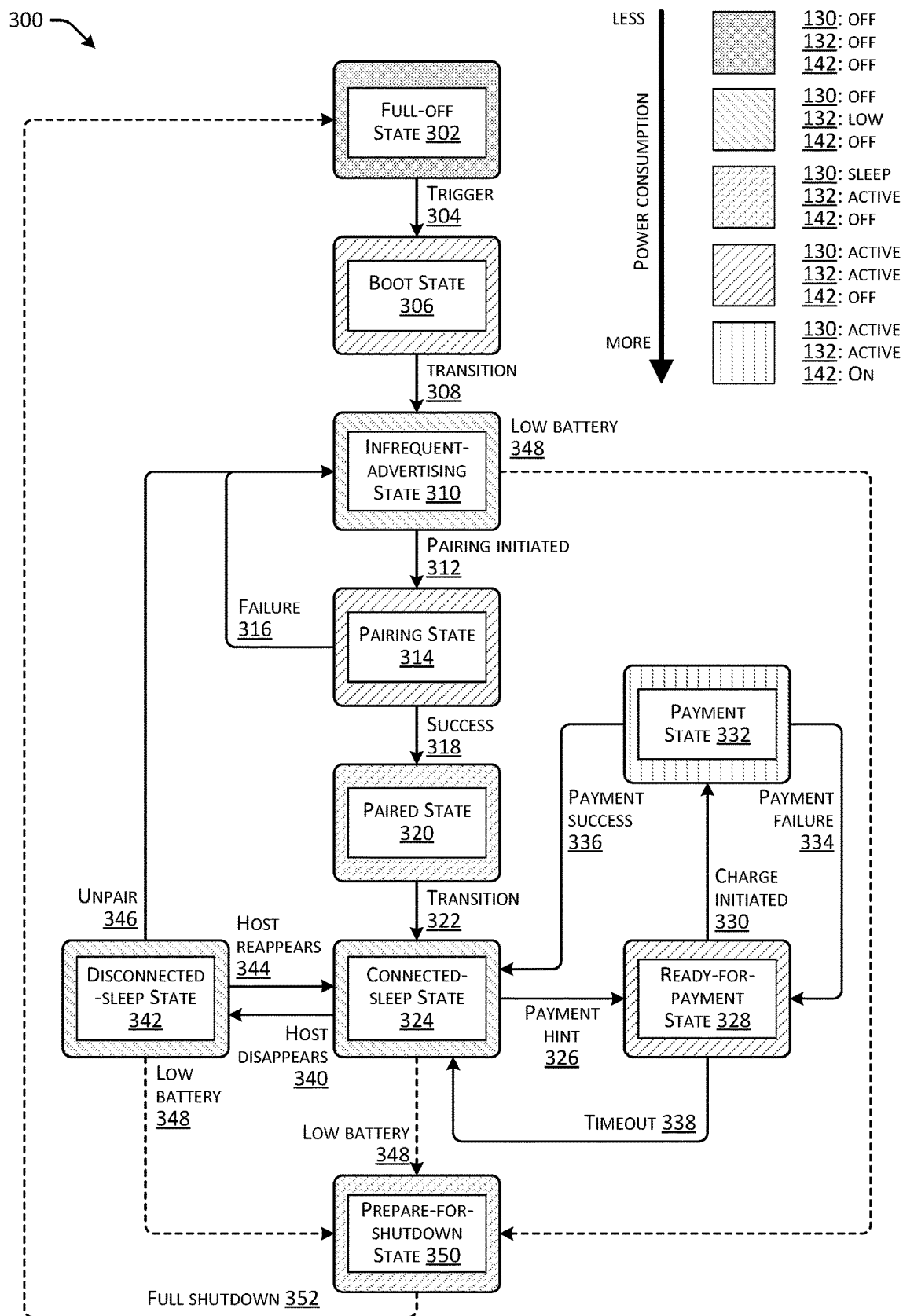
FIG. 3 illustrates example power states that the wireless payment readers described herein may utilize.

FIG. 3 illustrates the example power states 300 that the wireless payment reader 102 may utilize. FIG. 3 further illustrates, via cross-hatching and a corresponding legend, an amount of power consumed in the varying power states relative to one another, as well as an indication of whether the microcontrollers and NFC antenna are on in each given power state.

As illustrated, the wireless payment reader 102 may begin in a full-off state 302 in which the primary microcontroller 130, the short-range-wireless microcontroller 132, and the NFC antenna 142 are off. Upon receiving a trigger 304, such as a button push, plugging in the device, or awaking the wireless payment reader 102 via an RF field, the wireless payment reader 102 may transition to a boot state 306. In the boot state, the wireless payment reader 102 may power on and, thus, for a relatively short amount of time, both the primary microcontroller 130 and the short-range-wireless microcontroller 132 may be active, while the NFC antenna 142 may remain off.

After booting, a transition 308 may result in the wireless payment reader 102 entering an infrequent-advertising state, in which the primary microcontroller 130 is disabled (e.g., off) and the short-range-wireless microcontroller 132 is enabled, although in a low-power mode. That is, given that the wireless payment reader 102 may infrequently send advertisement messages during the infrequent-advertising state (e.g., every one second), the power consumed by the short-range-wireless microcontroller 132 may be relatively low.

Upon an initiated pairing 312, the wireless payment reader 102 may enter a pairing state 314, during which time the wireless payment reader 102 and the POS device 104 (or other device) exchange pairing information in order to become paired. During the pairing state, which may be relatively short, both the primary microcontroller 130 and the short-range-wireless microcontroller 132 may be active, while the NFC antenna may remain off. If a failure 316 occurs, the wireless payment reader 102 may transition back to the infrequent-advertising state 310. Upon a pairing success 318, meanwhile, the wireless payment reader 102 may transition to a paired state, in which the primary microcontroller 130 is disabled (e.g., in a sleep mode) and the short-range-wireless microcontroller 132 enabled (e.g., active). Again, the NFC antenna 142 remains off.

After entering the paired state 320, the wireless payment reader 102 may relatively quickly experience a transition 322 to a connected-sleep state 324, in which the primary microcontroller 130 is disabled (e.g., off) and the short-range-wireless microcontroller 132 is enabled, although in a low-power mode. That is, given that the wireless payment reader 102 may infrequently send check-in messages during the connected-sleep state (e.g., every one second), the power consumed by the short-range-wireless microcontroller 132 may be relatively low.

The wireless payment reader 102 may remain in the connected-sleep state 324 until receiving a payment hint 326, which may comprise the POS application sending in response to an item being added to a virtual cart, a merchant navigating to a certain menu or interface of the POS application (e.g., a payment menu), or the like. In response to receiving the payment hint 326, the wireless payment reader 102 may transition to the ready-for-payment state 328, in which the primary microcontroller 130 is enabled and the short-range-wireless microcontroller 132 is enabled. Further, in response to receiving from the POS device 104 an indication 330 that a charge has been initiated, the wireless payment reader 102 may transition to a payment state 332 in which both microcontrollers are enabled and the NFC antenna is turned on. In the payment state 332, the wireless payment reader 102 may be fully enabled and ready to accept payment data from a payment instrument via the NFC antenna 142, the chip reader 144, and/or other means of the wireless payment reader 102.

If a payment failure 334 occurs, such as unsuccessfully receiving the payment data or having a timeout occur, then the wireless payment reader 102 may transition back to the ready-for-payment state 328. Upon a payment success 336, however, the wireless payment reader 102 may accept and encrypt the payment data and may send the encrypted payment data to the POS device 104 for sending to the payment service 108. In some instances, the wireless payment reader 102 may send this encrypted payment data via a secure session using the techniques described below with reference to FIGS. 4A-B. Further, after the payment success 336, the wireless payment reader 102 may transition back to the connected-sleep state 324.

As noted above, the wireless payment reader 102 may transition from the connected-sleep state 324 to the ready-for-payment state 328 in response to receiving the payment hint 326. In some instances, however, in response to the host, such as the POS device, disappearing 340 (e.g., the POS device failing to respond to a check-in message for a threshold amount of time), the wireless payment reader 102 may transition to a disconnected-sleep state 342, in which the primary microcontroller 130 remains off, the short-range-wireless microcontroller 132 is on, and the NFC antenna 142 is off. As described above, the wireless payment reader 102 may remain paired to the host, such as the POS device 104, while in this state, but may send the check-in messages even less frequently than when in the connected-sleep state 324. Upon the host reappearing 344 (e.g., by responding to a check-in message), the wireless payment reader may transition back to the connected-sleep state 324. If, however, a threshold amount of time elapses without the disappeared host responding to a check-in message, then the wireless payment reader 102 may unpair 346 and transition back to the infrequent-advertising state 310.

In some instances, when the wireless payment reader 102 encounters a low battery 348 (i.e., a battery life that is less than a threshold), the wireless payment reader 102 may transition to a prepare-for-shutdown state 350. In the prepare for shutdown state 350, the primary microcontroller may be disabled (e.g., asleep), the NFC antenna 142 may be disabled (e.g., off), and the short-range-wireless microcontroller 132 may be enabled. The wireless payment reader 102 may then perform a full shutdown 352 and transition back to the full-off state 302.

Figure 4A:
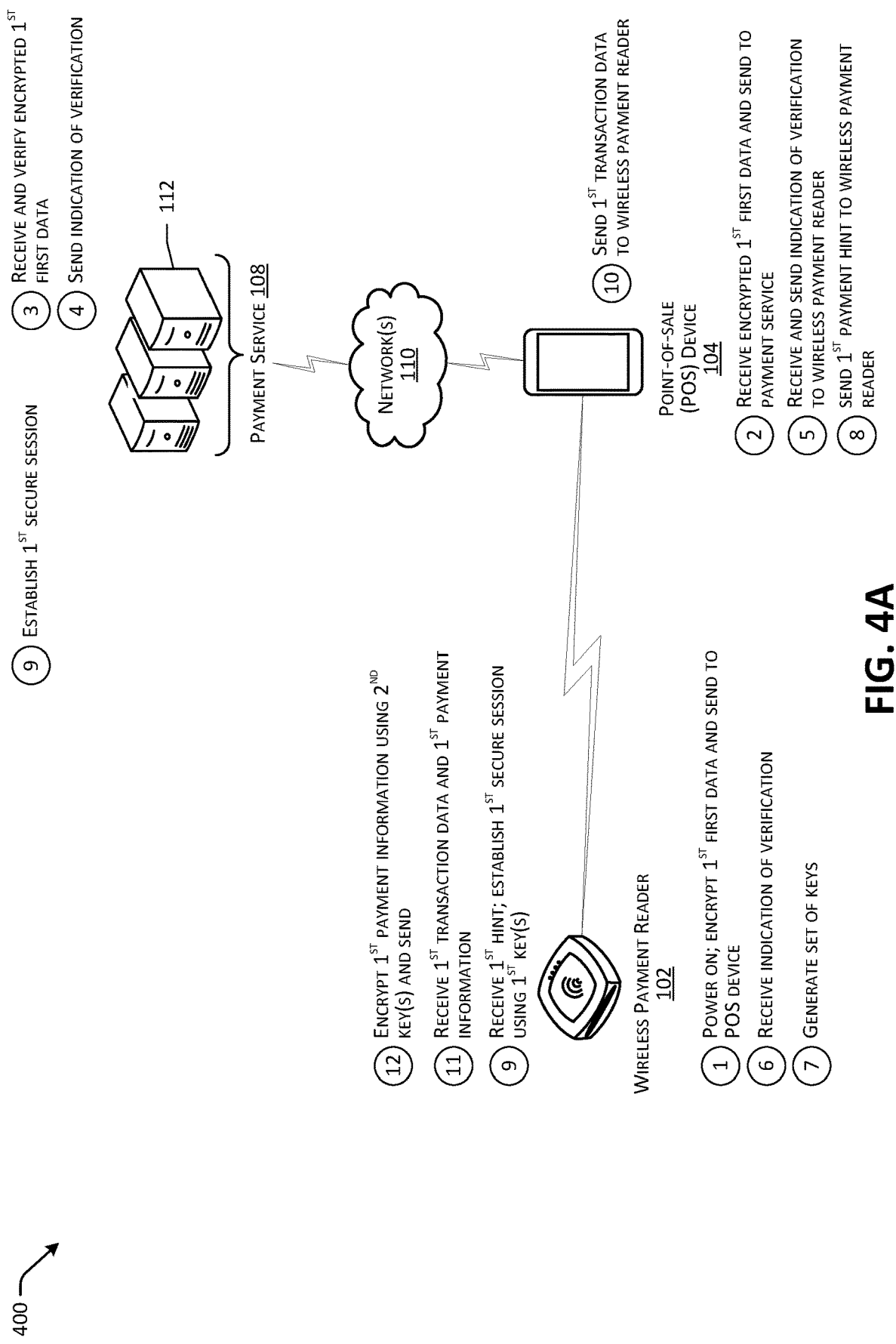
FIGS. 4A-B collectively illustrate a flow of operations for performing a payment transaction using the POS device, wireless payment reader, and payment service of FIG. 1. As illustrated, the wireless payment reader is configured to store an indication of a current key location in persistent memory prior to entering a sleep state and, further, to retrieve the indication of the current key location upon awaking.
Figure 4B:
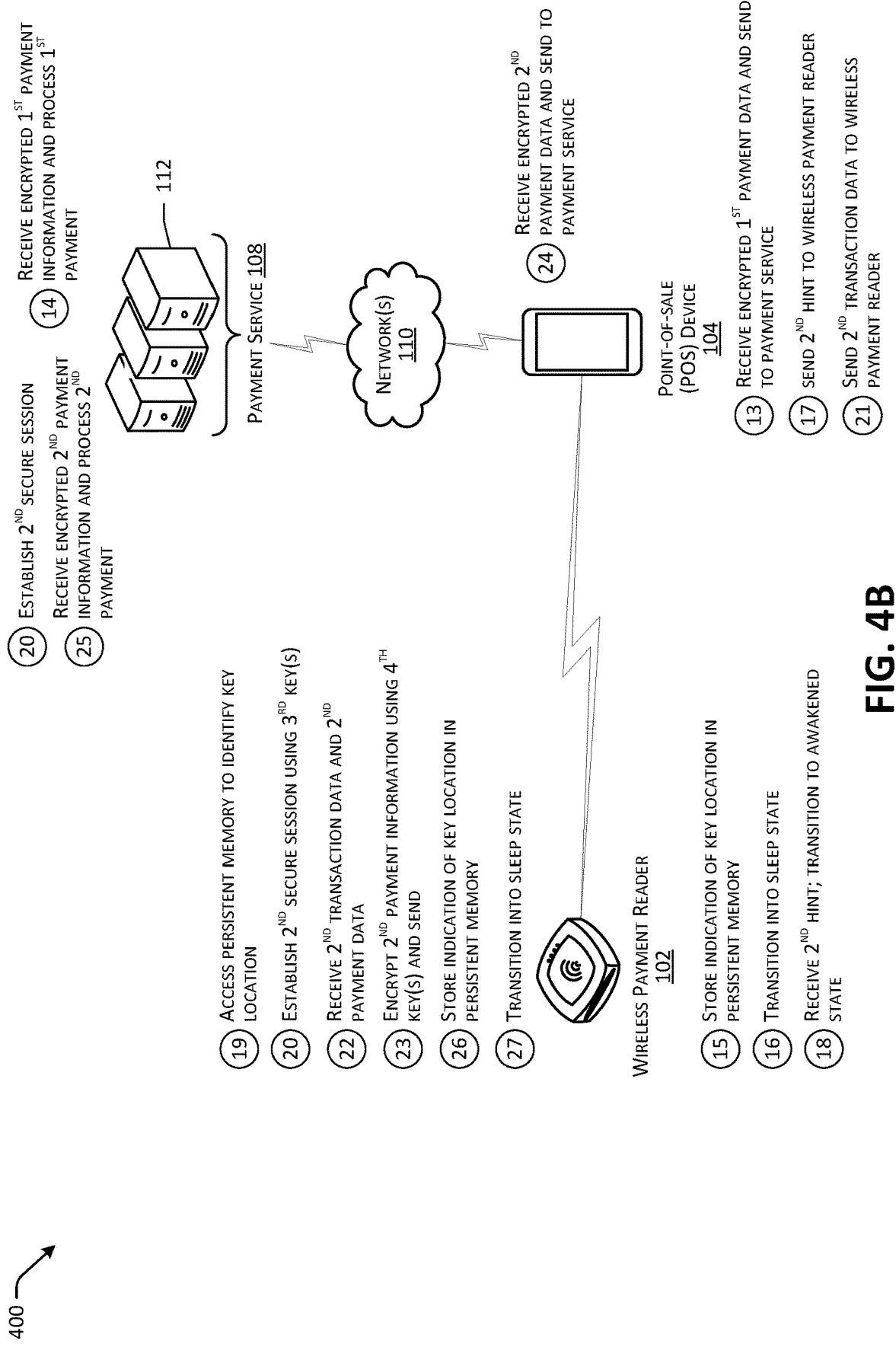

FIGS. 4A-B collectively illustrate a flow of operations 400 for performing a payment transaction using the POS device 104, the wireless payment reader 102, and the payment service 108. In some instances, the flow of operations 400 enables the wireless payment reader 102 to transition between the different power states described above with reference to FIG. 3 while avoiding significant latency upon transitioning from a lower-power state, such as the connected-sleep state 324 to a higher-power state, such as the ready-for-payment state 328. For instance, the wireless payment reader 102 may be configured to store, in persistent memory of the wireless payment reader 102 and prior to transitioning from a higher-power state to a lower-power state, certain data for use in a cryptographic process for establishing a secure session with the payment 108. By doing so, the wireless payment reader 102 may retrieve the stored data upon transitioning back to the higher-power state at a later time, thereby avoiding the need to re-acquire the data or different data from the payment service 108, thus reducing the latency associated with performing certain cryptographic processes and, thus, reducing the latency associated with processing a payment transaction using the wireless payment reader 102. In some instances, some of the operations in the flow of operations 400 performed by the wireless payment reader 102 may be performed by the encryption logic 138.

As illustrated, at "1" the wireless payment reader 102 may initially power on, encrypted first data, and send this encrypted first data to the POS device 104. In some instances, the first data may be encrypted using one or more cryptographic keys injected into the wireless payment reader 102 at a time of manufacture of the reader, while the first data may be encrypted using these key(s) for the purpose of verifying the identity and authenticity of the wireless payment reader 102 at the payment service 108. At "2", the POS device 104 receives the encrypted first data and sends the encrypted first data to the payment service 108, which receives and verifies the encrypted first data at "3". That is, the payment service 108 may also store data related to the cryptographic key(s) associated with the wireless payment reader 102 and may use this data for verifying the encrypted first data. For example, the wireless payment reader 102 may use a private key to sign the first data and the payment service 108 may use a corresponding public key to verify the authenticity of the signing.

At "4", the payment service 108 sends an indication that the first data has been verified to the POS device 104, which receives the indication at "5" and sends this indication to the wireless payment reader 102. At "6", the wireless payment reader 102 receives the indication of the verification and, in response, generates a first set of cryptographic keys at "7". For instances, the indication sent by the payment service and received by the wireless payment reader 102 may instruct the wireless payment reader 102 how to generate the set of cryptographic keys, which may involve performing a Diffie-Hellman key exchange with the POS device 104 and/or the payment service 108 in some instances. After generating the set of cryptographic keys, the wireless payment reader 102 may be ready to establish a secure session with the payment service using one or more of the keys and/or encrypt payment data using one or more of the keys. In some instances, this set of cryptographic keys may correspond to the keys 150 of FIG. 1 and may be associated with a corresponding index 152 indicating the order in which the wireless payment reader 102 is to use particular key(s) of the set, which key is the next key to be used, and/or the like.

Sometime after the wireless payment reader 102 has generated the set of keys, the POS device 104 may send a hint to the wireless payment reader 102 at "8". In some instances, this hint may comprise an instruction that the wireless payment reader 102 should begin readying to receive payment data and may be sent in response to a POS application 120 adding an item to a virtual cart, navigating to a certain menu or interface, or the like. At "9", the wireless payment reader 102 may receive the hint and, in response, may establish a first secure session with the payment service 108 via the POS device 104 using one or more first keys of the set of cryptographic data. The wireless payment reader 102 may also update the index 152 to indicate that third key(s) are to be used next. At "9", the payment service 108 also interacts with the wireless payment reader 102 to establish the first secure session.

At "10", the POS device 104 sends first transaction data to the wireless payment reader 102. For example, a merchant operating the POS device 104 may use the POS application 120 to select an icon or other input control indicating that the payment transaction is to be initiated. For instance, the merchant may select an icon to checkout or otherwise pay for one or more items associated with a transaction. In response, the POS device may send the first transaction data to the wireless payment reader 102, which may comprise a cost of the items and/or the like.

At "11", the wireless payment reader 102 receives the first transaction data, as well as first payment information (or "payment data"), which may comprise information read by the wireless payment reader 102 from a payment instrument of a user engaging in the transaction with the merchant. For instance, the wireless payment reader 102 may both receive the transaction data from the POS device 104, as well as payment information from a payment instrument inserted into the chip reader 144, placed near the NFC antenna 142, swiped in a magnetic-stripe reader of the wireless payment reader 102, or the like. At "12", the wireless payment reader 102 may encrypt the first payment information using one or more second keys of the set of cryptographic keys, as indicated by the index 152. That is, the index 152 may indicate that the wireless payment reader 102 is to use the second key(s) (after having used the first key(s)) and, thus, the wireless payment reader 102 may use the second keys to encrypt the first payment information and may send the encrypted first payment information to the POS device 104 via the first secure session. The wireless payment reader 102 may also update the index 152 to indicate that third key(s) are to be used next.

FIG. 4B continues the flow of operations 400 and includes, at "13", the POS device 104 receiving the encrypted first payment data and sending it to the payment service 108. At "14", the payment service 108 receives the encrypted first payment data, decrypts the first payment data, and attempts to process the first payment using this data. For instance, the payment service 108 may have used a shared-secret or the like to generate cryptographic keys corresponding to the set of cryptographic keys generated by the wireless payment reader 102 and may use these keys to decrypt the first payment data. Thereafter, the payment service 108 may use the payment data to attempt to authorize the underlying payment instrument for the cost of the transaction.

At "15", and after sending the encrypted first payment data via the first secure session, the wireless payment reader 102 may store an indication of the current key location in persistent memory of the wireless payment reader 102. For instance, the wireless payment reader 102 may store the index 152 or data indicating a current location in the index 152 for use by the wireless payment reader 102. For instance, given that the wireless payment reader 102 has used the first key(s) and second key(s) thus far, the wireless payment reader 102 may store, in the persistent memory, an indication that the next key(s) to be used are the third key(s). In some instances, the wireless payment reader 102 may store this indication in the persistent memory 146 of the primary microcontroller 130, the persistent memory 148 of the short-range-wireless microcontroller 132, or in other persistent memory of the wireless payment reader 102.

At "16", and after storing the indication in the persistent memory, the wireless payment reader 102 may transition into a sleep state. For instance, the wireless payment reader 102 may transition into one of the lower-power states discussed above with reference to FIGS. 2 and 3. For example, the wireless payment reader 102 may transition to the connected-sleep state 324 after storing the indication of the current key location in the persistent memory.

At "17", and at some time thereafter, the POS device 104 may send a second hint to the wireless payment reader 102. For instance, the merchant of the POS device 104 may again operate the POS application 120 to add an item to a cart, navigate to a predefined menu or interface of the POS application 120, or otherwise send data indicative of a new transaction to the wireless payment reader 102. At "18", the wireless payment reader 102 receives the second hint and, in response, transitions from a sleep state to an awakened state. For instance, the wireless payment reader 102 may transition from the connected-sleep state 324 to the ready-for-payment state 328. This may involve the short-range-wireless microcontroller 132 receiving the indication and awakening the primary microcontroller 130.

At "19", and after transitioning to the awakened state, the wireless payment reader 102 may access its persistent memory to identify the current key location. For instance, the encryption logic 138 may access the persistent memory to retrieve the index 152 or the data indicating a current location in the index 152. In this example, encryption logic 138 may access the data and determine that the wireless payment reader 102 is to begin by using the third key(s) in the set of cryptographic keys 150. By determining this information upon awakening, the wireless payment reader 102 avoids engaging in a back-and-forth operation with the payment service 108 in order to regenerate a new set of cryptographic keys, such as those operations discussed above with reference to operations "1" through "7".

At "20", the wireless payment reader 102 may establish a second secure session using one or more third keys of the set of cryptographic keys 150, as indicated by the index 152 or other data stored in the persistent memory. At "20", the payment service 108 also establishes the second secure session. At "21", the POS device 104 sends second transaction data to the wireless payment reader 102. For example, a merchant operating the POS device 104 may use the POS application 120 to select an icon or other input control indicating that a payment transaction corresponding to the second transaction is to be initiated. For instance, the merchant may select an icon to checkout or otherwise pay for one or more items associated with a transaction. In response, the POS device 104 may send the second transaction data to the wireless payment reader 102, which may comprise a cost of the items and/or the like.

At "22", the wireless payment reader 102 receives the second transaction data, as well as second payment information (or "payment data"), which may comprise information read by the wireless payment reader 102 from a payment instrument of a user engaging in the second transaction with the merchant. For instance, the wireless payment reader 102 may both receive the second transaction data from the POS device 104, as well as payment information from a payment instrument inserted into the chip reader 144, placed near the NFC antenna 142, swiped in a magnetic-stripe reader of the wireless payment reader 102, or the like. At "23", the wireless payment reader 102 may encrypt the second payment information using one or more fourth keys of the set of cryptographic keys, as indicated by the index 152. That is, the index 152 may indicate that the wireless payment reader 102 is to use the fourth key(s) (after having just used the third key(s)) and, thus, the wireless payment reader 102 may use the fourth keys to encrypt the second payment information and may send the encrypted second payment information to the POS device 104 via the second secure session. The wireless payment reader 102 may also update the index 152 to indicate that fifth key(s) are to be used next.

At "24", the POS device 104 receives the encrypted second payment data and sends it along to the payment service 108. At "25", the payment service 108 receives the encrypted second payment data, decrypts the second payment data, and attempts to process the second payment using this data. For instance, the payment service 108 may use the unencrypted payment data to attempt to authorize the underlying payment instrument for the cost of the transaction.

At "26", and after sending the encrypted second payment data via the second secure session, the wireless payment reader 102 may store an indication of the current key location in persistent memory of the wireless payment reader 102. For instance, the wireless payment reader 102 may store the index 152 or data indicating a current location in the index 152 for use by the wireless payment reader 102. For instance, given that the wireless payment reader 102 has used the first, second, third, and fourth key(s) thus far, the wireless payment reader 102 may store, in the persistent memory, an indication that the next key(s) to be used are the fifth key(s). In some instances, the wireless payment reader 102 may store this indication in the persistent memory 146 of the primary microcontroller 130, the persistent memory 148 of the short-range-wireless microcontroller 132, or in other persistent memory of the wireless payment reader 102.

At "27", and after storing the indication in the persistent memory, the wireless payment reader 102 may transition into a sleep state. For instance, the wireless payment reader 102 may transition into one of the lower-power states discussed above with reference to FIGS. 2 and 3. For example, the wireless payment reader 102 may transition to the connected-sleep state 324 after storing the indication of the current key location in the persistent memory.

Figure 5A:
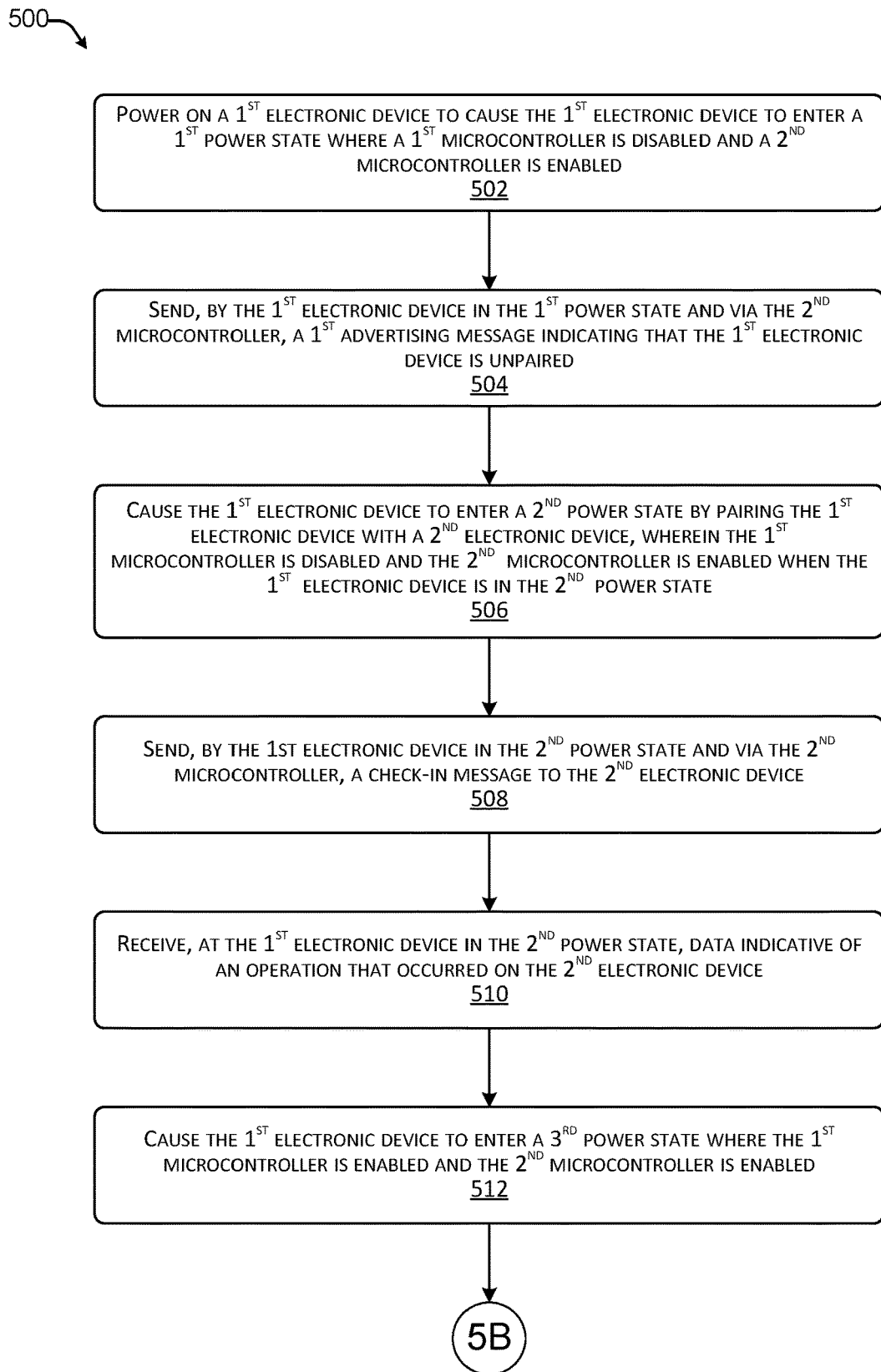
FIGS. 5A-C collectively illustrate a flow diagram of an example process for causing a wireless payment reader to transition between different power states.
Figure 5B:
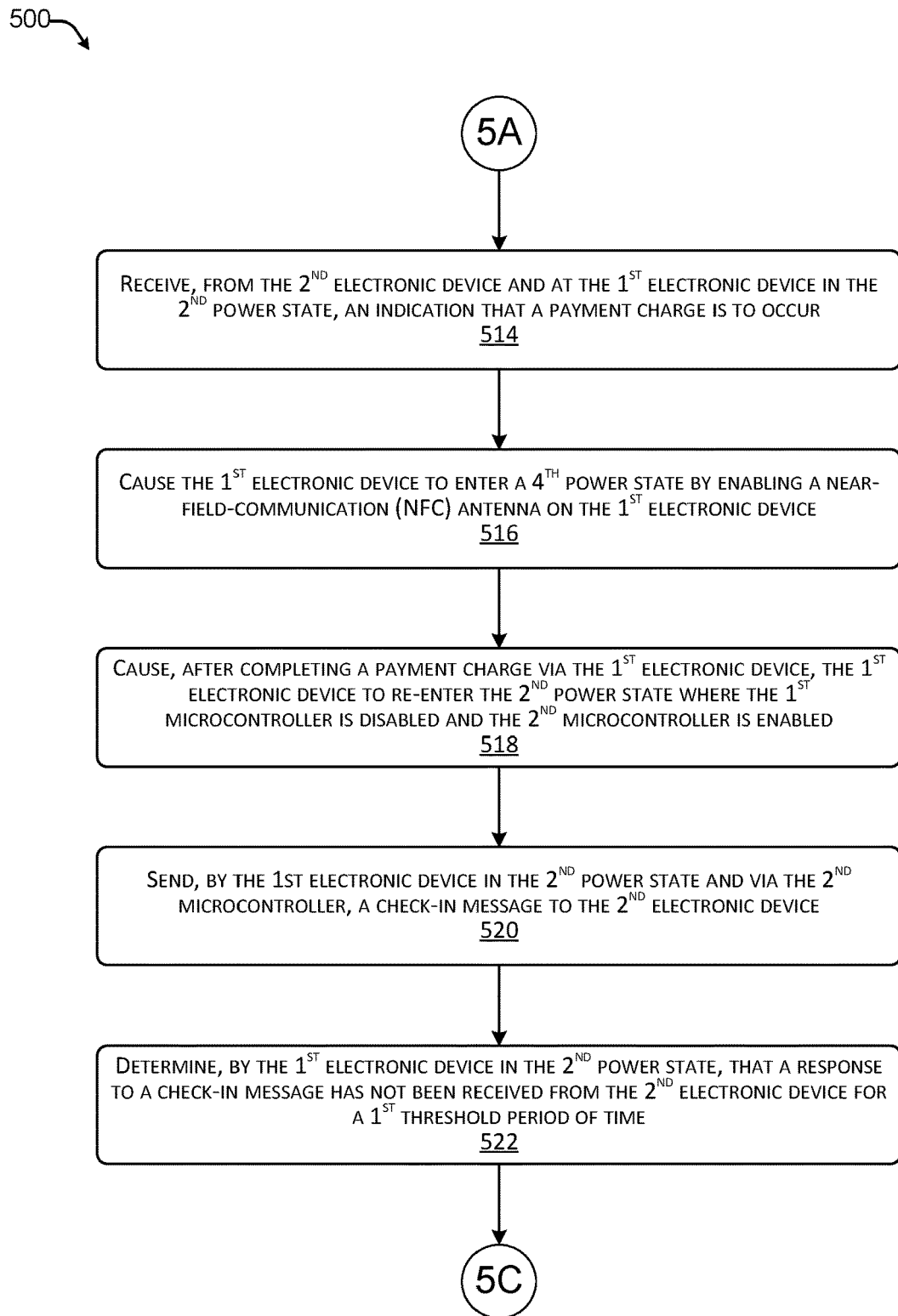
Figure 5C:
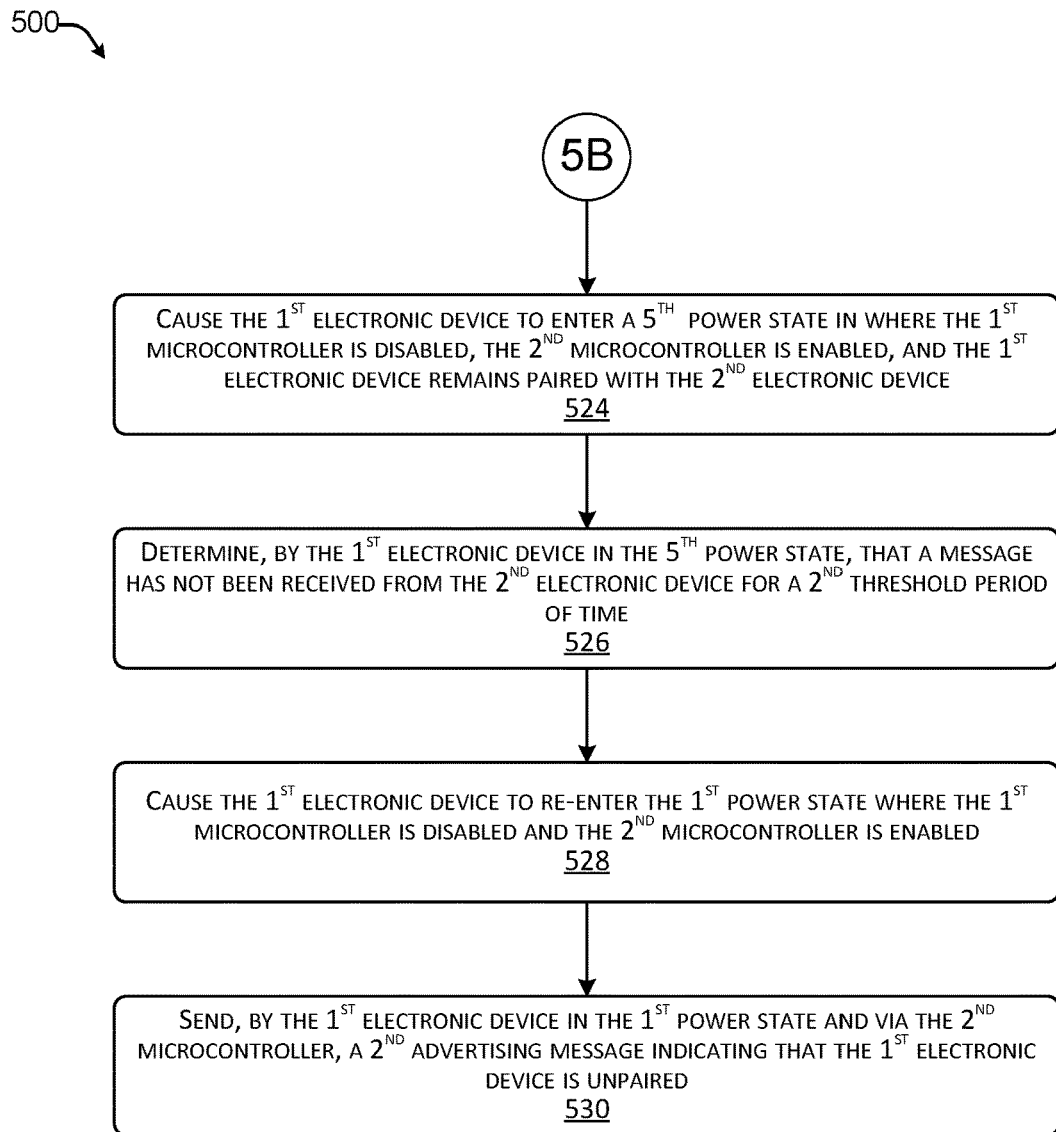

FIGS. 5A-C collectively illustrate a flow diagram of an example process 500 for causing a wireless payment reader to transition between different power states. In some instances, the power-state logic 136 may perform some or all of the operations of the process 500.

At an operation 502, the process 500 may include powering on a first electronic device to cause the first electronic device to enter a first power state where a first microcontroller is disabled and a second microcontroller is enabled. For instance, the operation 502 may comprise powering on the first electronic device in response to a button of the device being pressed, the device being plugged in, the device being awoken via RF sense, or the like. In addition, the first power state may comprise the infrequent-advertising state 310 described above with reference to FIGS. 2 and 3. Further, in some instances, the first electronic device comprises a wireless payment reader and the second electronic device comprises a point-of-sale (POS) device operating a POS application. Further, the first microcontroller may comprise a primary microcontroller of the first electronic device, while the second microcontroller may comprise a short-range-wireless microcontroller configured to communicate over a short-range wireless network.

At an operation 504, the process 500 may include sending, by the first electronic device in the first power state and via the second microcontroller, an advertising message indicating that the first electronic device is unpaired. For instance, this operation may comprise the first electronic device sending an advertising message as described above.

At an operation 506, the process 500 may include causing the first electronic device to enter a second power state by pairing the first electronic device with a second electronic device, wherein the first microcontroller is disabled and the second microcontroller is enabled when the first electronic device is in the second power state. For instance, the second power state may correspond to the connected-sleep power state, described above with reference to FIGS. 2 and 3, in which the first electronic device sends periodic check-in messages to the second electronic device. At an operation 508, the process 500 may include sending, by the first electronic device in the second power state and via the second microcontroller, a check-in message to the second electronic device.

At an operation 510, the process 500 may include receiving, at the first electronic device in the second power state, data indicative of an operation that occurred on the second electronic device. In some instances, the data indicative of the operation that occurred on the second electronic device comprises data indicating that an item has been added to a virtual shopping cart on the second electronic device, data indicating that an application executing on the second electronic device has navigated to a predefined menu or interface, or the like.

At an operation 512, the process 500 may include causing the first electronic device to enter a third power state where the first microcontroller is enabled and the second microcontroller is enabled. In some instances, the third power state may comprise the ready-for-payment power state described above with reference to FIGS. 2 and 3.

FIG. 5B continues the illustration of the process 500 and includes, at an operation 514, receiving, from the second electronic device and at first electronic device (e.g., the wireless payment reader) in the second power state, an indication that a payment charge is to occur. For instance, the second electronic device may send this indication in response to a POS application executing on the second electronic device indicating that that an order is to be completed and payment taken.

At an operation 516, the process 500 may include causing the wireless payment reader to enter a fourth power state by enabling a near-field-communication (NFC) antenna on the wireless payment reader. For instance, the fourth power state may correspond to the payment state 332 described above with reference to FIGS. 2 and 3.

At an operation 518, the process 500 may include causing, after completing the payment charge via the wireless payment reader, the wireless payment reader to re-enter the second power state where the first microcontroller is disabled and the second microcontroller is enabled. For instance, this may comprise transitioning the first electronic device back to the connected-sleep state 324. At an operation 520, the process 500 may include sending, by the first electronic device in the second power state and via the second microcontroller, a check-in message to the second electronic device.

At an operation 522, the process 500 may include determining, by the first electronic device in the second power state, that a response to a check-in message has not been received from the second electronic device for a first threshold period of time.

FIG. 5C continues the illustration of the process 500 and includes at, an operation 524, causing the first electronic device to enter a fifth power state in where the first microcontroller is disabled, the second microcontroller is enabled, and the first electronic device remains paired with the second electronic device. For instance, this fifth power state may correspond to the disconnected-sleep state 342 described above with reference to FIGS. 2 and 3.

At an operation 526, the process 500 may include determining, by the first electronic device in the fifth power state, that a message has not been received from the second electronic device for a second threshold period of time. At an operation 528, and in response, the process 500 may include causing the first electronic device to re-enter the first power state where the first microcontroller is disabled and the second microcontroller is enabled.

At an operation 530, the process 500 may include sending, by the first electronic device in the first power state and via the second microcontroller, a second advertising message indicating that the first electronic device is unpaired.

Figure 6A:
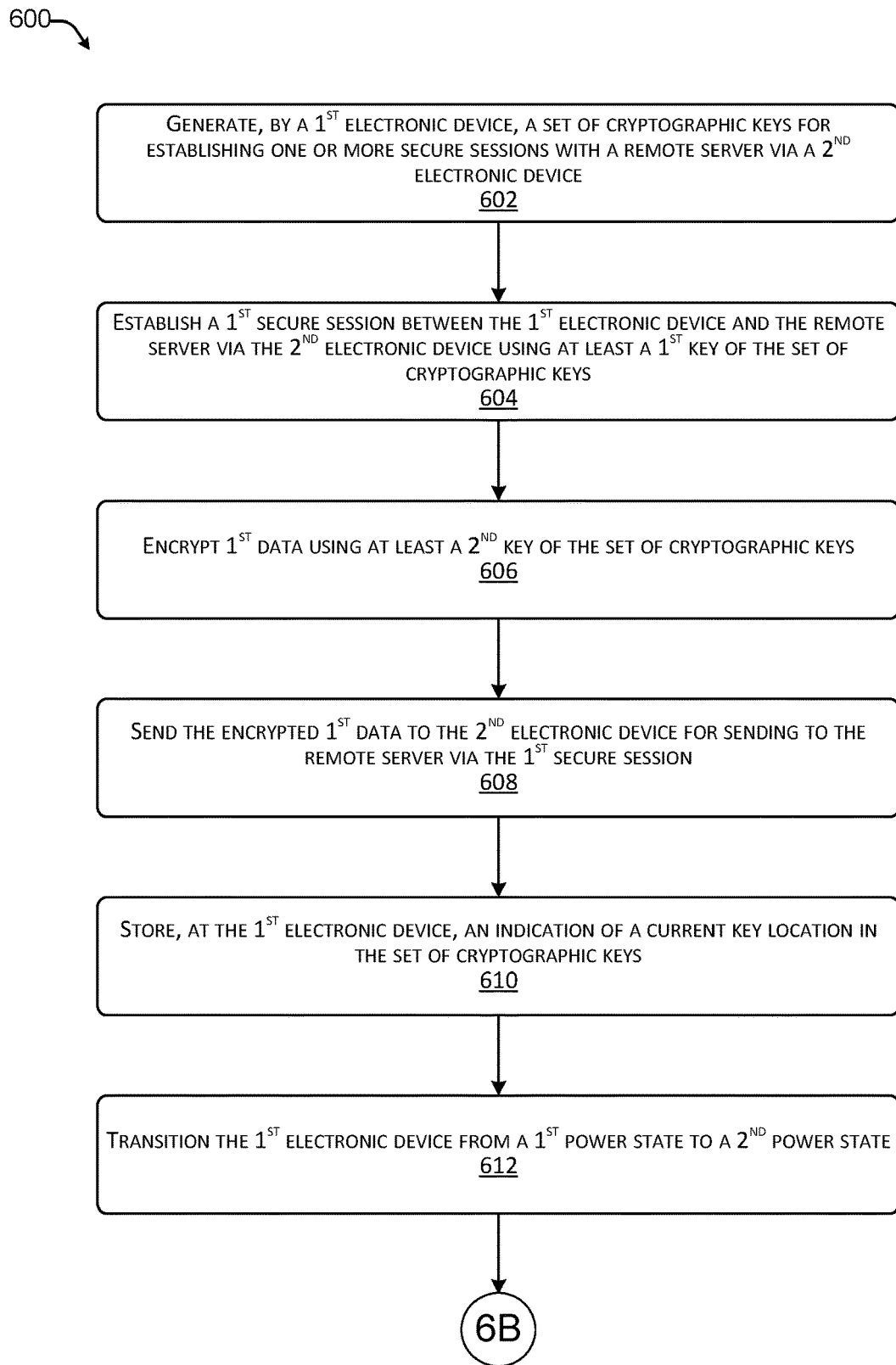
FIGS. 6A-B collectively illustrate a flow diagram of an example process for performing techniques to reduce latency associated with performing cryptographic operation at a wireless payment reader.
Figure 6B:
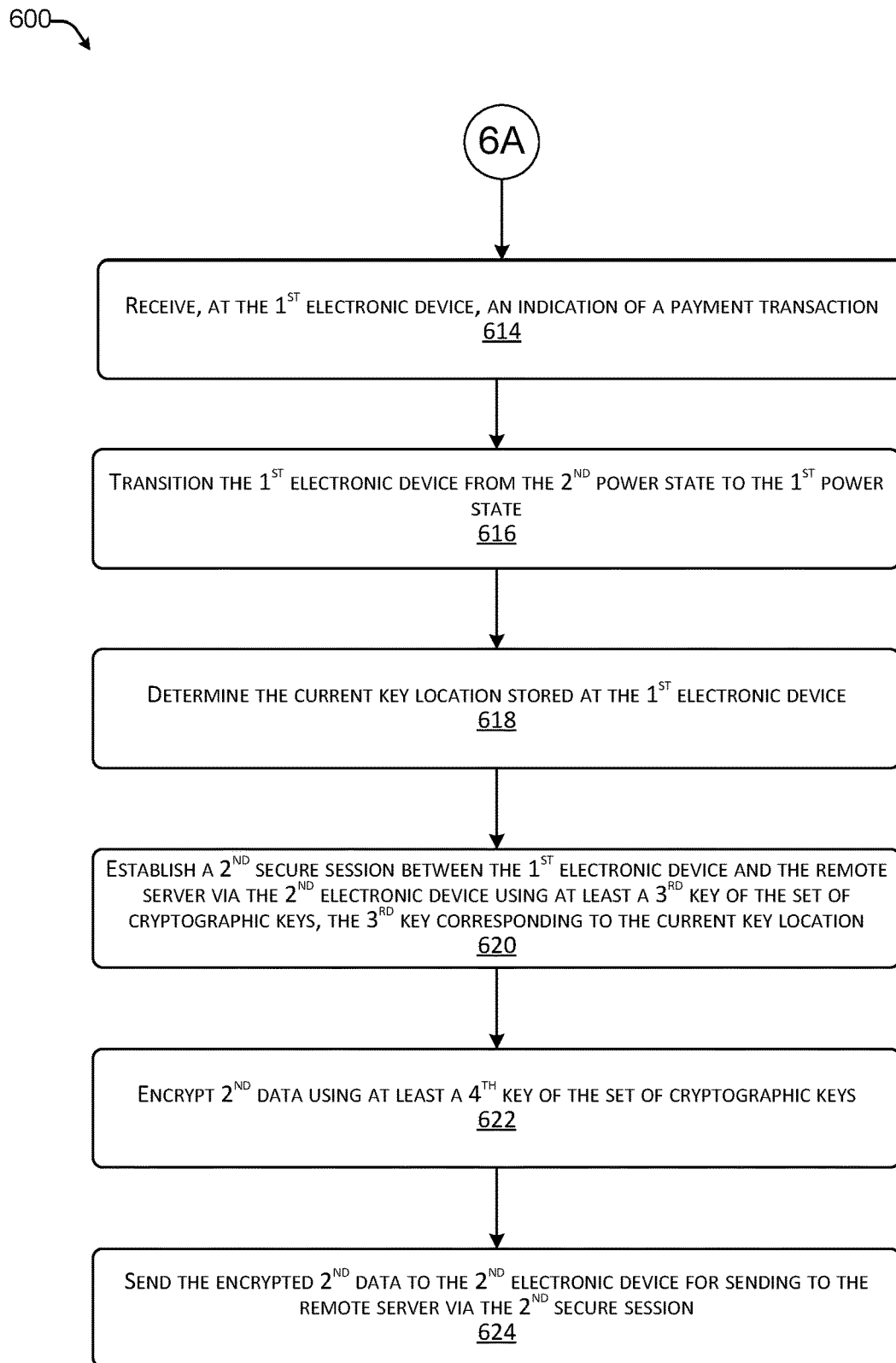

FIGS. 6A-B collectively illustrates a flow diagram of an example process 600 for performing techniques to reduce latency associated with performing cryptographic operation at a wireless payment reader, such as the wireless payment reader 102. In some instances, the encryption logic 138 may perform some or all of the operations of the process 600.

At an operation 602, the process 600 may include generating, by a first electronic device, a set of cryptographic keys for establishing one or more secure sessions with a remote server via a second electronic device. For instance, this operation may comprise generating the set of cryptographic keys 150, along with the corresponding index 152. In some instances, the first electronic device comprises a wireless payment reader, the second electronic device comprises a POS device, and the wireless payment reader couples to the POS device over a wireless network.

At an operation 604, the process 600 may include establishing a first secure session between the first electronic device and the remote server via the second electronic device using at least a first key of the set of cryptographic keys.

At an operation 606, the process 600 may include encrypting first data using at least a second key of the set of cryptographic keys. In some instances, encrypting the first data comprises encrypting first payment information associated with a first payment transaction. At an operation 608, the process 600 may include sending the encrypted first data to the second electronic device for sending to the remote server via the first secure session.

At an operation 610, the process 600 may include storing, at the first electronic device, an indication of a key location in the set of cryptographic keys. In some instances, the first electronic device comprises at least one microcontroller and the storing comprises storing the indication of the key location in persistent memory of the at least one microcontroller.

At an operation 612, the process 600 may include transitioning the first electronic device from a first power state to a second power state. In some instances, the first electronic device comprises a primary microcontroller and a short-range-wireless microcontroller configured to communicate with the second electronic device over a short-range wireless network. Here, transitioning the first electronic device from the first power state to the second power state may comprise transitioning the first electronic device from the first power state to the second power state by at least partly powering down the primary microcontroller of the first electronic device.

FIG. 6B continues the illustration of the process 600 and includes, at an operation 614, receiving, at the first electronic device, an indication of a payment transaction.

At an operation 616, the process 600 may include transitioning the first electronic device from the second power state to the first power state. In some instances, transitioning the first electronic device from the second power state to the first power state comprises transitioning the first electronic device from the second power state to the first power state by at least partly powering up the primary microcontroller of the first electronic device. In some instances, this transitioning occurs at least partly in response to receiving the indication of the payment transaction of the operation 614.

At an operation 618, the process 600 may include determining the key location stored at the first electronic device. For instance, this operation may comprise accessing the persistent memory of the first electronic device to determine the index 152 or a current key location in the index 152.

At an operation 620, the process 600 may include establishing a second secure session between the first electronic device and the remote server via the second electronic device using at least a third key of the set of cryptographic keys, the third key corresponding to the key location. At an operation 622, the process 600 may include encrypting second data using at least a fourth key of the set of cryptographic keys and an operation 624 may comprise sending the encrypted second data to the second electronic device for sending to the remote server via the second secure session.

Figure 7:
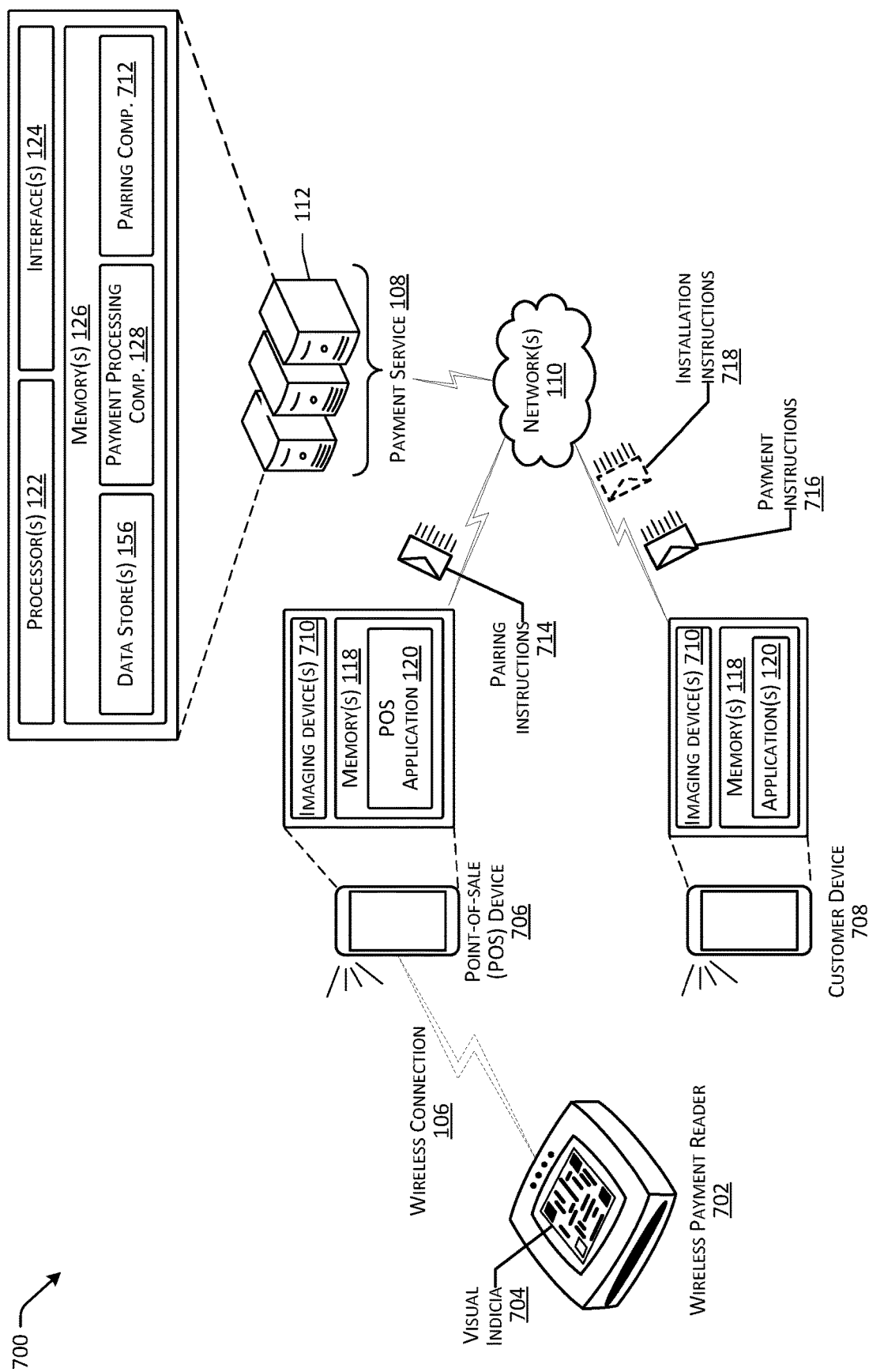
FIG. 7 illustrates the example environment of FIG. 1 where the payment reader includes visual indicia, such as a quick-response (QR) code, that may be scanned by mobile devices. The mobile devices may send data indicating the indicia to the payment service, which may send instructions back to the devices based on the current state of the payment reader.

FIG. 7 illustrates an example environment 700 that includes a wireless payment reader 702 that includes visual indicia 704 printed thereon that may be scanned by mobile devices, such as a POS device 706 and/or a customer device 708. As illustrated, the visual indicia 704 may comprise a quick-response (QR) code, a barcode, an image, an alpha-numeric character string, or any other visual indicia that is unique to visual indicia printed on other wireless payment readers.

In some instances, the visual indicia 704 may embed identifying information that identifies the wireless payment reader 702. In addition, the visual indicia 704 may embed instructions that, when captured by a device, instructs the device to navigate to a uniform resource locator (URL) or the like that links or otherwise points to content hosted by or associated with the payment service 108. For instance, when the POS device 706 or the customer device 708 scans the visual indicia 704 using an imaging device (e.g., camera) 710 of the respective device, the respective device may analyze the image and identifying the URL embedded therein and may cause the device to navigate to that URL (e.g., via a web browser application, an installed app linked to in the URL, etc.). The link may further include the information identifying the wireless payment reader 702 relative to other wireless payment readers.

The payment service 108 may include the one or more processors 122, interfaces 124, and memory 126, which may include the data stores 156, the payment-processing component 128, and a pairing component 712. The payment service 108 may receive an indication of the scan from the respective device and determine one or more instructions to generate and send to the respective device in response. For instance, the payment service 108 may use the identifier to identify the wireless payment reader 702 and access the data store 156 to locate information regarding the wireless payment reader 702, such as whether the wireless payment reader 702 is currently paired to a device (e.g., a POS device). If not, the payment service 108 may generate and send, to the device, instructions for causing the device to pair to the wireless payment reader 702. That is, given that the scan has occurred at a time when the wireless payment reader 702 is unpaired, the payment service (and, more specifically, the pairing component 712) may generate and send instructions for pairing to the wireless payment reader 702. If, however, the wireless payment reader 702 is already paired, then the payment service 108 (and, more specifically, the payment-processing component 128) may generate and send instructions for causing the device to enter a payment flow for paying for a transaction.

FIG. 7, for instance, illustrates that the POS device 706 may include a camera and may scan the visual indicia 704 of the wireless payment reader 702. The visual indicia 704 may include instructions that, when identified by the POS device 706, cause the POS device to open the POS application 120 and/or send an indication of the scan to the payment service 108. The payment service identifies, using the visual indicia 704, the wireless payment reader 702 and may determine that it is currently unpaired. In response, the pairing component 712 may generate pairing instructions 714 and send the pairing instructions 714 to the POS device 706.

Upon receiving the paring instructions 714, the POS device 706 may open and execute the instructions, which include information for engaging in a pairing handshake for pairing with the POS device 706. The POS device 706 may now be paired with and associated with the wireless payment reader 702 and, thus, may use the wireless payment reader 702 to take payment from customers.

At a later time, the customer device 708 may scan the visual indicia 704 using an imaging device (e.g., camera) 710 of the customer device 708. As illustrated, the customer device 708 may store one or more applications 120 in memory 118, which may comprise an application previously provided by the payment service 108, a web browsing application, and/or the like. In response to scanning the visual indicia 704, the customer device 708 may identify the URL embedded therein, which may cause the customer device 708 to open an application previously provided by the payment service (e.g., a POS application or buyer-side application) in instances where the memory 118 stores such an application. This application may then send an indication of the scan to the payment service 108. In other instances where the memory 118 does not store any such application, a web browsing application may send the indication of the scan, or the URL embedded in the visual indicia 704 may include a link to an application store in order to enable a user of the customer device 708 to download and install an application provided by the payment service 108.

In this example, the customer device 108 sends an indication of the scan to the payment service 108, which receives the information identifying the wireless payment reader 702 and identifies the wireless payment reader 702 using the information. In this instance, the payment service 108 may determine that the wireless payment reader 702 is already paired to a device (here, the POS device 706) and, thus, may cause the payment-processing component 128 to generate payment instructions 716 that, when executed, cause the customer device 708 to enter an online payment flow for settling a cost of a transaction at a merchant associated with the POS device 706 and wireless payment reader 702. For instance, the payment instructions 716 may cause the customer device 708 to output an instruction that instructs a user to tap the customer device 708 or a payment instrument to the wireless payment reader 702, insert or swipe a payment instrument to the wireless payment reader 702, or cause the customer device 708 to present a series of online payment-flow interfaces.

In some instances, the payments service 108 may determine, based on a web-browsing application sending the information associated with the visual indicia 704, that the customer device 708 does not store an application provided by the payment service 108. In response to making this determination, the payment service 108 may generate installation instructions 718 that instructs and/or causes the customer device 708 to download the application provided by the payment service 108.

As illustrated, the environment 700 provides a wireless payment reader 702 that includes visual indicia 704 that may be scanned by POS devices and/or customer devices. In response to a scan taking place when the wireless payment reader 702 is currently unpaired, the payment service may generate and send instructions for pairing to the wireless payment reader 702. In response to a scan occurring when the wireless payment reader 702 is already paired, the payment service may generate and send instructions for causing the device to enter a payment flow. Thus, the wireless payment reader 702 may be configured to interact with both merchants and buyers in the environment 700.

Further, while FIG. 7 illustrates sending instructions for pairing to the wireless payment reader 702 in response to a user device scanning the visual indicia 704, in other instances these instructions may be sent in response to other inputs. For instance, the wireless payment reader may additionally or alternatively include a passive element, such as an NFC tag, that is able to be excited by an NFC reader of the POS device 706 and, in response, emit data over NFC identifying the reader 706. Thus, when the wireless payment reader 702 is delivered to a merchant of the POS device 706, the POS device 706 may read the pairing/identification information from the reader 702 in response to being placed proximate to (or in response to "tapping") the reader 702. After receiving this information, the POS device 706 may send this information to the payment service 108, which may send the pairing instructions back to the POS device 706. The POS device 706 may then perform the pairing process upon the wireless payment reader 702 being powered on for a first time.

Further, in still other instances a package in which the wireless payment reader 702 is delivered to the merchant may include a passive element, such as the NFC tag. In some instances, the NFC tag of the package may include the information referenced immediately above to enable the POS device 706 to pair to the wireless payment reader 702. Thus, upon the POS device being placed proximate to (or tapping) the package, the POS device 706 may receive the pairing/identification via NFC, may send this information to the payment service 108, and may receive the pairing instructions in response.

In still other instances, both the package and the wireless payment reader 702 may include respective passive elements, such as respective NFC tags. In some instances, when the merchant removes the reader 702 from the package, the NFC reader (or other component) of the POS device 706 may sense the changing (e.g., increasing) distance between the two NFC tags (indicating that the merchant is unboxing the reader 702) and, in response, may initiate a pairing process with the reader 702, read the pairing/payment information from the reader 702, and/or the like.

Figure 8:
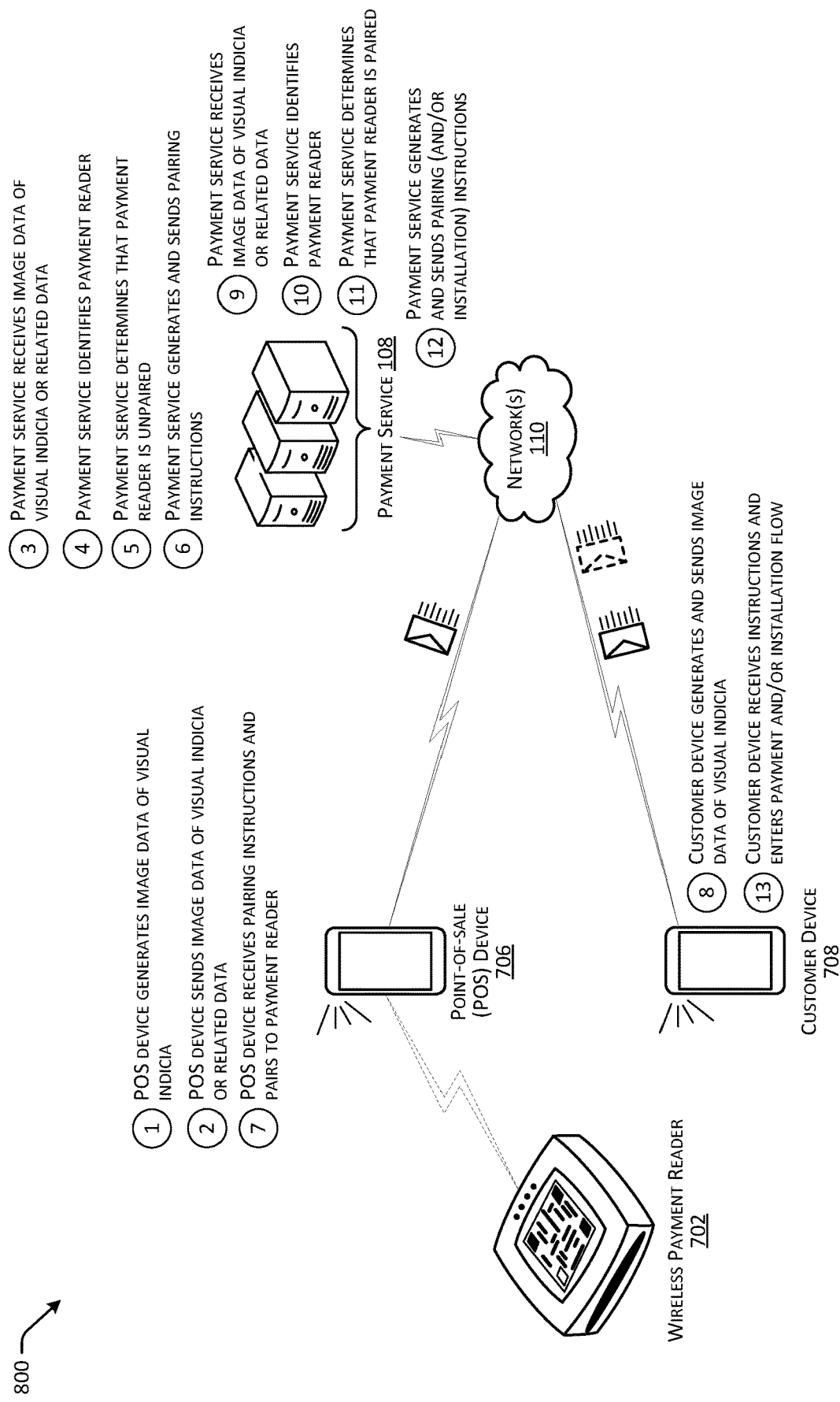
FIG. 8 illustrates a flow of operations for a first mobile device (e.g., a POS device) that scans a QR code of the payment reader and, in response, receives pairing instructions from the payment service, as well as a second mobile device (e.g., a customer device) that scans the QR code and, in response, receives payment instructions from the payment service.

FIG. 8 illustrates a flow of operations 800 for a first mobile device (e.g., the POS device 706) that scans a QR code of the payment reader 702 and, in response, receives pairing instructions 714 from the payment service 108, as well as a second mobile device (e.g., the customer device 708) that scans the QR code and, in response, receives payment instructions 716 from the payment service 108. At "1", the POS device 706 generates image data of the visual indicia 704 and sends the image data to the payment service 108. For instance, a user of the POS device may open a camera application on the POS device 706 and may capture an image of the indicia 704. In response, the camera application may identify the URL or other information embedded in the visual indicia, which may cause the POS device 706 to send an indication of the scan to the payment service 108 at "2". For instance, the POS device 706 may send the image data or may send, to the URL, an indication that the scan of the visual indicia 704 occurred.

At "3", the payment service 108 receives the image data and/or the related data (e.g., the indication of the scan) from the POS device 706. At "4", the payment service 108 uses the received data to identify the wireless payment reader 702. At "5", the payment service determines that the wireless payment reader is unpaired. For instance, the payment service 108 may access a data store storing information about the wireless payment reader 702 to determine that it is currently unpaired. In response, at "6", the payment service 108 may generate pairing instructions 714 and send the pairing instructions 714 to the POS device 706. As will be appreciated, the pairing instructions 714 may include information for engaging in a pairing handshake with the wireless payment reader 702 over a short-range wireless network, such as Bluetooth, Zigbee, and/or the like. At "7", the POS device 706 receives the pairing instructions 714 uses these instructions to pair to the wireless payment reader 702 over the short-range wireless network.

At "8", and sometime after the POS device 706 pairs to the wireless payment reader 702 in this example, the customer device 708 generates image data of the visual indicia and sends the image data or related data to the payment service 108. For instance, a user of the customer device 708 may operate the camera application to scan the visual indicia 704. The customer device 708 may identify the information embedded within the visual indicia 704 and, in response, send data to the URL embedded therein.

At "9" the payment service 108 receives the image data or the related data and, at "10", uses information associated with the request to identify the wireless payment reader 702. At "11", the payment service 108 determines that the wireless payment reader 702 is already paired and, thus, at "12" generates payment instructions 716 and sends these instructions to the customer device 708. The payment instructions 716 may be executable by the customer device 708 to enter into an online payment flow for settling a cost of a payment transaction. In some instances, the payment service 108 may determine, based on the received data, that the customer device 708 does not store an application offered by the payment service 108 and, thus, the payment service 108 may also generate and send installation instructions 718 for enabling the customer device 708 to install the application.

At "13", the customer device 708 receives the payment instructions 716 and/or the installation instructions 718. When the installation instructions 718 are received, the customer device 708 may execute these instructions to install an application provided by the payment service 108 or present a request to install the application on a display or other output device of the customer device 708. In addition, the payment instructions 716 may cause the customer device 708 to enter into a payment flow or may instruct the user to perform some payment-related action, such as tap the customer device 708 or a payment instrument to the wireless payment reader 702, insert or swipe a payment instrument to the wireless payment reader 702, and/or the like. Further, while one customer device 708 is illustrated, it is to be appreciated that other customer devices (or devices in general) that scan the visual indicia 704 after the wireless payment reader 702 has been paired may receive the payment instructions 716 and/or the installation instructions 718.

Figure 9A:
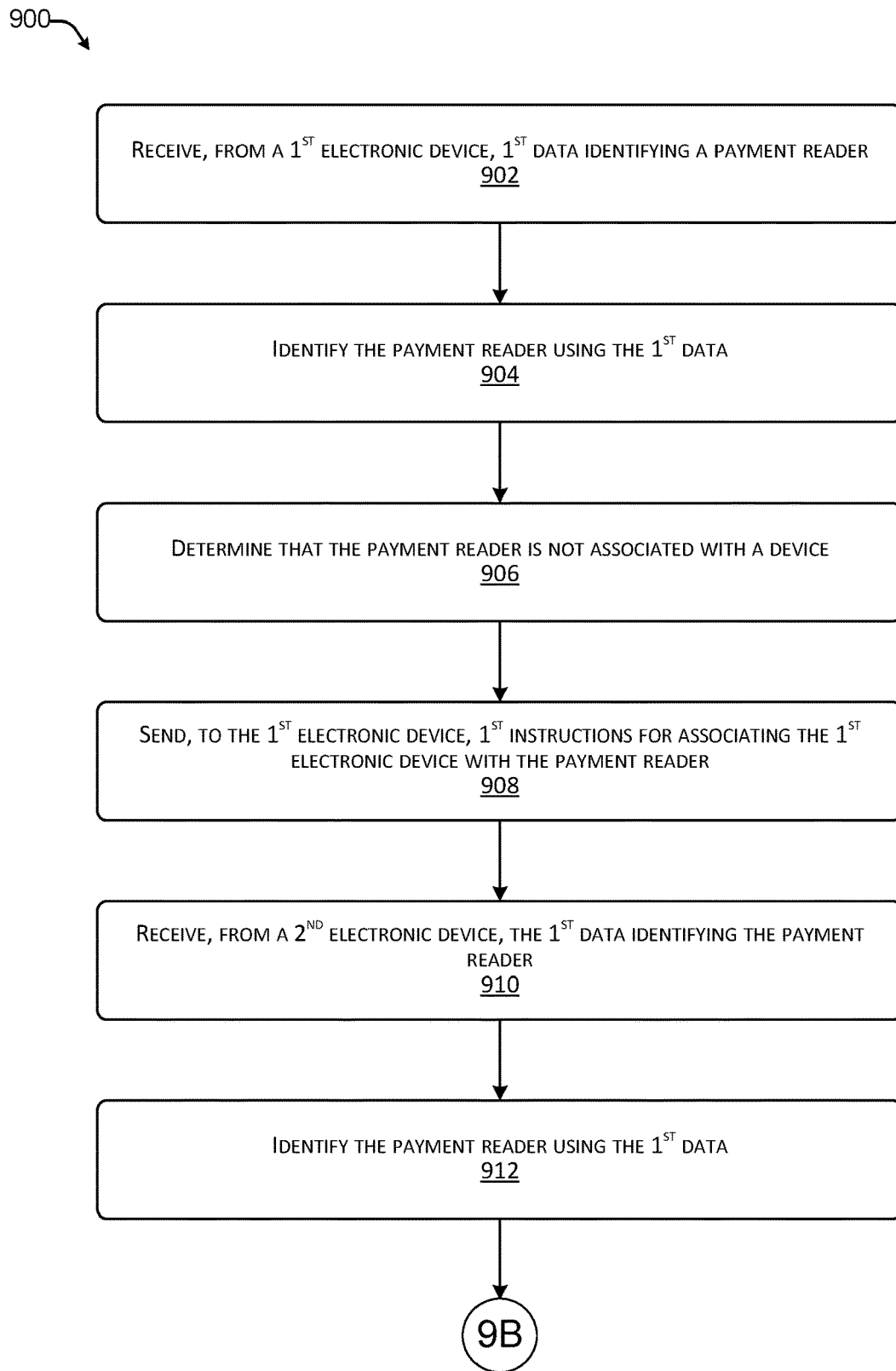
FIGS. 9A-B collectively illustrate a flow diagram of an example process in which a payment service sends instructions to mobile devices that provide data identifying a payment reader, with the instructions being based on the current state of the payment reader.
Figure 9B:
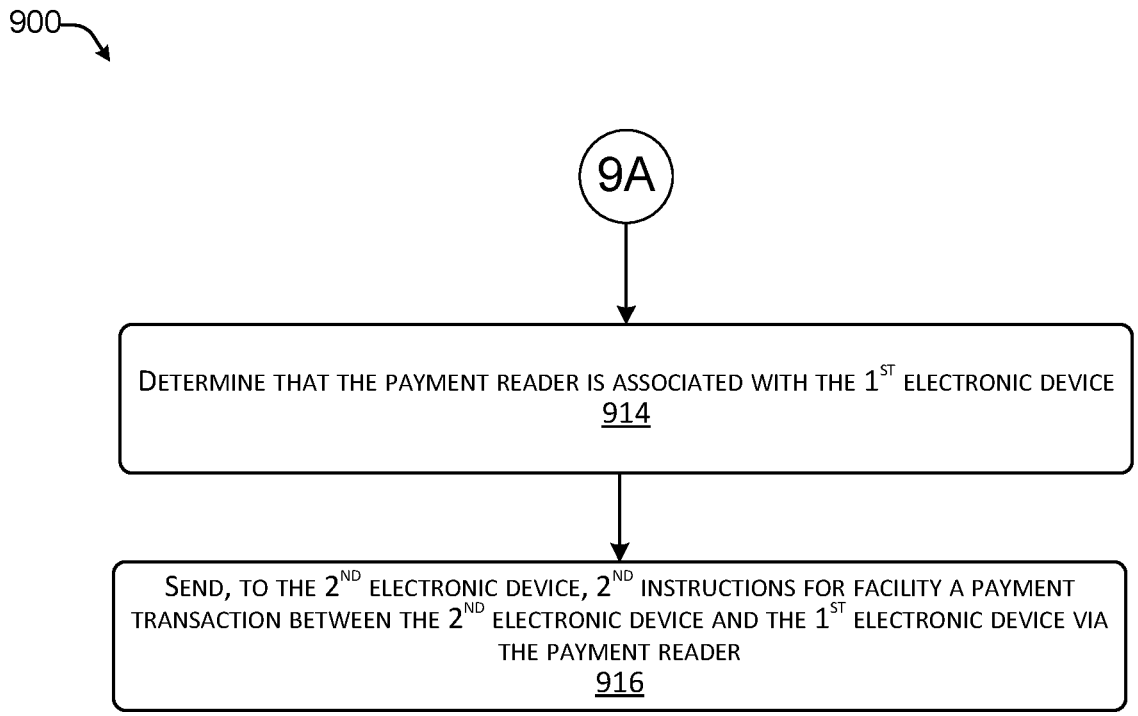

FIGS. 9A-B collectively illustrate a flow diagram of an example process 900 in which the payment service 108 sends instructions to mobile devices that provide data identifying a payment reader 702, with the instructions being based on the current state of the payment reader 702.

At an operation 902, the process 900 may include receiving, from a first electronic device, first data identifying a payment reader. In some instances, the payment reader comprises a wireless payment reader configured to wirelessly couple to a device over a short-range wireless network, such as Bluetooth, Zigbee, or the like. Further, the receiving the first data from the first electronic device may comprise receiving a first indication of visual indicia printed on the payment reader, with the first electronic device generating the first data representing the visual indicia using an imaging device of the first electronic device. The visual indicia may comprise a QR code, a barcode, an image, or alphanumeric character string, or the like.

At an operation 904, the process 900 may include identifying the payment reader using the first data. For instance, this operation may include using the first data identifying the payment reader to access information identifying the payment reader in a data store.

At an operation 906, the process 900 may include determining that the payment reader is not associated with a device. This may include determining that the wireless payment reader is not wirelessly paired to a device over the short-range wireless network.

At an operation 908, the process 900 may include sending, to the first electronic device, first instructions for associating the first electronic device with the payment reader. In some instances, the sending the first instructions to the first electronic device may comprise sending the first instructions to the first electronic device at least partly in response to determining that the payment reader is not associated with a device.

At an operation 910, the process 900 may include receiving, from a second electronic device, the first data identifying the payment reader. In some instances, the receiving the first data from the second electronic device comprises receiving a second indication of the visual indicia printed on the payment reader, the second electronic device generating the first data representing the visual indicia using an imaging device of the second electronic device.

At an operation 912, the process 900 may include identifying the payment reader using the first data. For instance, this operation may include using the first data identifying the payment reader to access information identifying the payment reader in a data store.

FIG. 9B continues the illustration of the process 900 and includes, at an operation 914, the process 900 determining that the payment reader is associated with the first electronic device. For instance, the data store may store information regarding the current state of the payment reader and, thus, may store an indication that the payment reader is not currently paired to a device.

At an operation 916, the process 900 may include sending, to the second electronic device, second instructions for facilitating a payment transaction between the second electronic device and the first electronic device via the payment reader. In some instances, the sending the second instructions to the second electronic device may comprise sending the second instructions to the second electronic device at least partly in response to determining that the payment reader is associated with the first electronic device. The second instructions may comprise instructions to cause the second electronic device to output instruction data instructing a user to tap the second electronic device or a payment instrument to the payment reader to make a payment or insert or swipe a payment instrument to the payment reader to make a payment, or instructions to cause the second electronic device to enter an online payment flow for making a payment.

Figure 10:
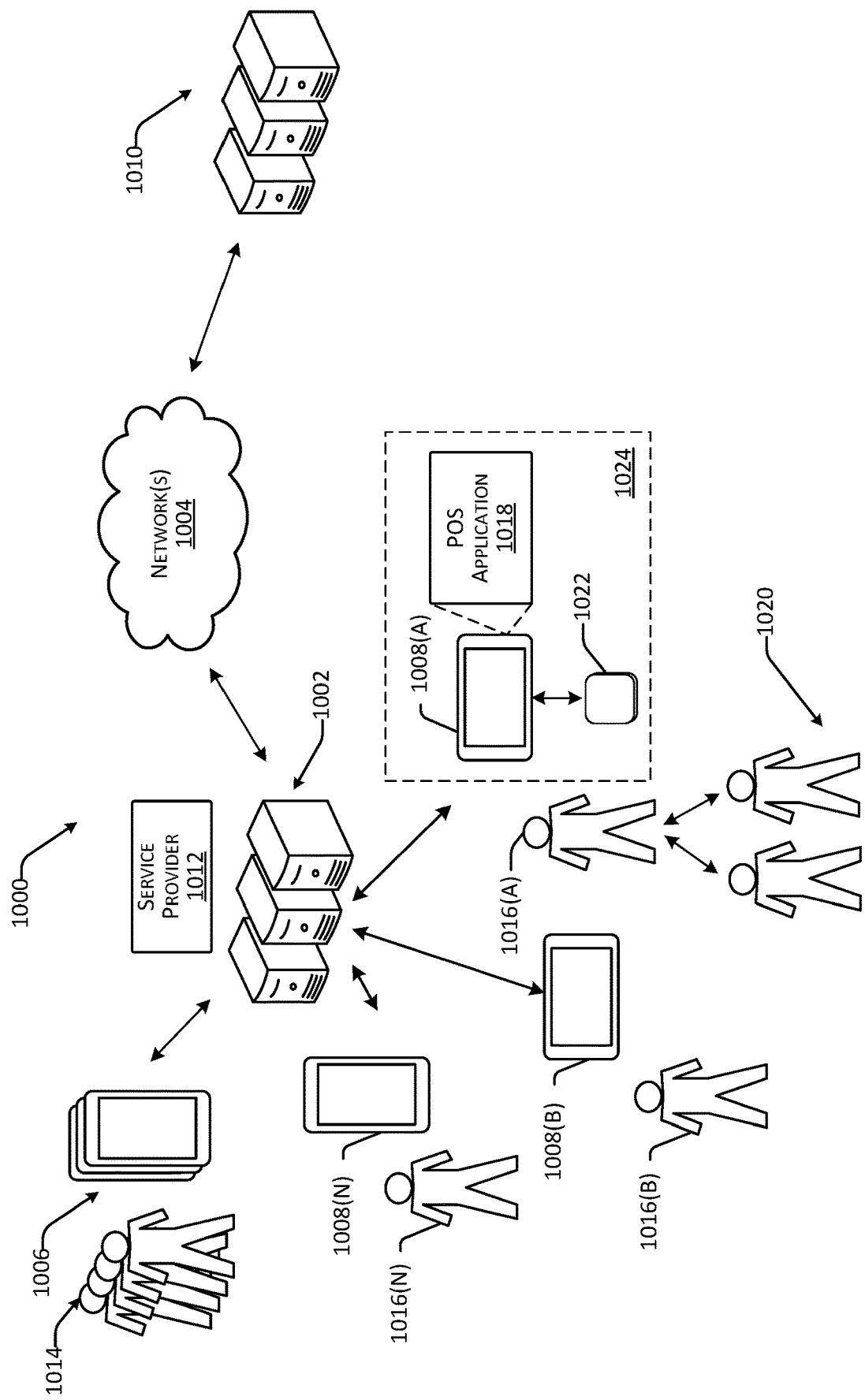
FIG. 10 illustrates an example merchant ecosystem for facilitating, among other things, techniques described herein.

FIG. 10 illustrates an example environment 1000. The environment 1000 includes server computing device(s) 1002 that can communicate over a network 1004 with user devices 1006 (which, in some examples can be merchant devices 1008 (individually, 1008(A)-1008(N))) and/or server computing device(s) 1010 associated with third-party service provider(s). The server computing device(s) 1002 can be associated with a service provider 1012 that can provide one or more services for the benefit of users 1014, as described below. Actions attributed to the service provider 1012 can be performed by the server computing device(s) 1002.

In at least one example, the service provider 1012 can correspond to the payment service described above. In at least one example, the server computing device(s) 1002 can correspond to the server(s) 112 and the network(s) 1004 can correspond to the network(s) 110 described above with reference to FIG. 1.

The environment 1000 can include a plurality of user devices 1006. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as buyers, customers, sellers, merchants, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider 1012 or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, biometric input, and/or any other type of input.

In at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more buyers 1020. As described above, the users 1014 can include buyers, such as the buyers 1020 shown as interacting with the merchant 1016(A). For the purpose of this discussion, a "buyer" can be any entity that acquires items from merchants. While only two buyers 1020 are illustrated in FIG. 10, any number of buyers 1020 can interact with the merchants 1016. Further, while FIG. 10 illustrates the buyers 1020 interacting with the merchant 1016(A), the buyers 1020 can interact with any of the merchants 1016.

In at least one example, interactions between the buyers 1020 and the merchants 1016 that involve the exchange of funds (from the buyers 1020) for items (from the merchants 1016) can be referred to as "POS transactions" and/or "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server computing device(s) 1002. Furthermore, the POS application 1018 can present a UI to enable the merchant 1016(A) to interact with the POS application 1018 and/or the service provider 1012 via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication-based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. Additional details are described below with reference to FIG. 11. In some examples, the reader device 1022 can read information from alternative payment instruments including, but not limited to, wristbands and the like, or can function itself as a virtual wallet, cryptocurrency wallet, and/or hardware wallet. In some instances, the reader device 1022 corresponds to the wireless payment reader 102 described above.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server computing device(s) 1002, which can provide, among other services, a payment processing service. The server computing device(s) 1002 associated with the service provider 1012 can communicate with server computing device(s) 1010, as described below. In this manner, the POS terminal and reader device 1022 may collectively process transaction(s) between the merchants 1016 and buyers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the buyers 1020. In additional or alternative examples, the POS terminal can have a display integrated therein for presenting information to the buyers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a buyer 1020 slides a card, or other payment instrument, having a magnetic strip through a reader device 1022 that captures payment data contained in the magnetic strip. A dip is a card-present transaction where a buyer 1020 inserts a payment instrument having an embedded microchip (i.e., chip) into a reader device 1022 first. The dipped payment instrument remains in the payment reader until the reader device 1022 prompts the buyer 1020 to remove the card, or other payment instrument. While the payment instrument is in the reader device 1022, the microchip can create a one-time code which is sent from the POS system 1024 to the server computing device(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, buyer, etc.), or payment data is required to be recalled from a card-on-file data store, to complete the transaction.

The POS system 1024, the server computing device(s) 1002, and/or the server computing device(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server computing device(s) 1002 over the network(s) 1004. The server computing device(s) 1002 may send the transaction data to the server computing device(s) 1010. As described above, in at least one example, the server computing device(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1010 associated therewith) can send a fund transfer request to a server computing device of a card payment network (e.g., Mastercard®, VISA®, etc.) to determine whether the transaction is authorized or deficient. In at least one example, the service provider 1012 can serve as an acquirer and connect directly with the card payment network.

The card payment network (e.g., the server computing device(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1010 associated therewith) can make a determination as to whether the buyer has the capacity to absorb the relevant charge associated with the payment transaction. In at least one example, the service provider 1012 can serve as an issuer and/or can partner with an issuer. The transaction is either approved or rejected by the issuer and/or the card payment network (e.g., the server computing device(s) 1010 associated therewith), and a payment authorization message is communicated from the issuer to the POS device via a path opposite of that described above, or via an alternate path.

As described above, the server computing device(s) 1010, which can be associated with payment service provider(s), may determine whether the transaction is authorized based on the transaction data, as well as information relating to parties to the transaction (e.g., the buyer 1020 and/or the merchant 1016(A)). The server computing device(s) 1010 may send an authorization notification over the network(s) 1004 to the server computing device(s) 1002, which may send the authorization notification to the POS system 1024 over the network(s) 1004 to indicate whether the transaction is authorized. The server computing device(s) 1002 may also transmit additional information such as transaction identifiers to the POS system 1024. In one example, the server computing device(s) 1002 may include a merchant application and/or other functional components for communicating with the POS system 1024 and/or the server computing device(s) 1010 to authorize or decline transactions.

Based on the authentication notification that is received by the POS system 1024 from server computing device(s) 1002, the merchant 1016(A) may indicate to the buyer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1012 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, cryptocurrency management and/or custodial services, and so on. In some examples, the users 1014 can access all of the services of the service provider 1012. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider 1012 can offer payment processing services for processing payments on behalf of the merchants 1016, as described above. For example, the service provider 1012 can provision payment processing software, payment processing hardware and/or payment processing services to merchants 1016, as described above, to enable the merchants 1016 to receive payments from the buyers 1020 when conducting POS transactions with the buyers 1020. For instance, the service provider 1012 can enable the merchants 1016 to receive cash payments, payment card payments, and/or electronic payments from buyers 1020 for POS transactions and the service provider 1012 can process transactions on behalf of the merchants 1016.

As the service provider 1012 processes transactions on behalf of the merchants 1016, the service provider 1012 can maintain accounts or balances for the merchants 1016 in one or more ledgers. For example, the service provider 1012 can analyze transaction data received for a transaction to determine an amount of funds owed to a merchant 1016(A) for the transaction. In at least one example, such an amount can be a total purchase price less fees charged by the service provider 1012 for providing the payment processing services. Based on determining the amount of funds owed to the merchant 1016(A), the service provider 1012 can deposit funds into an account of the merchant 1016(A). The account can have a stored balance, which can be managed by the service provider 1012. The account can be different from a conventional bank account at least because the stored balance is managed by a ledger of the service provider 1012 and the associated funds are accessible via various withdrawal channels including, but not limited to, scheduled deposit, same-day deposit, instant deposit, and a linked payment instrument.

A scheduled deposit can occur when the service provider 1012 transfers funds associated with a stored balance of the merchant 1016(A) to a bank account of the merchant 1016(A) that is held at a bank or other financial institution (e.g., associated with the server computing device(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider 1012 deposits funds from the stored balance to a linked bank account of the merchant on a same day as POS transaction, in some examples prior to the POS transaction being funded) or instant deposits (e.g., wherein the service provider 1012 deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider 1012 to the bank account of the merchant 1016(A).

In at least one example, the service provider 1012 may provide inventory management services. That is, the service provider 1012 may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider 1012 can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider 1012 can offer recommendations related to pricing of the items, placement of items on the catalog, and multi-party fulfilment of the inventory.

In at least one example, the service provider 1012 can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider 1012 can provide financing services and products, such as via business loans, consumer loans, fixed term loans, flexible term loans, and the like. In at least one example, the service provider 1012 can utilize one or more risk signals to determine whether to extend financing offers and/or terms associated with such financing offers.

In at least one example, the service provider 1012 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1012 can offer different types of capital loan products. For instance, in at least one example, the service provider 1012 can offer a daily repayment loan product, wherein a capital loan is repaid daily, for instance, from a portion of transactions processed by the payment processing service on behalf of the borrower. Additionally, and/or alternatively, the service provider 1012 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally, or alternatively, the service provider 1012 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider 1012 can create the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1012 (e.g., from payments owed to the merchant from payments processed on behalf of the merchant, funds transferred to the merchant, etc.). The service provider 1012 can offer specific financial products, such as payment instruments, tied specifically to the loan products. For example, in one implementation, the server provider 1012 associates capital to a merchant or buyer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1012 can provide web-development services, which enable users 1014 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider 1012 can recommend and/or create content items to supplement omni-channel presences of the merchants 1016. That is, if a merchant of the merchants 1016 has a web page, the service provider 1012—via the web-development or other services—can recommend and/or create additional content items to be presented via other channel(s), such as social media, email, etc.

Furthermore, the service provider 1012 can provide payroll services to enable employers to pay employees for work performed on behalf of employers. In at least one example, the service provider 1012 can receive data that includes time worked by an employee (e.g., through imported timecards and/or POS interactions), sales made by the employee, gratuities received by the employee, and so forth. Based on such data, the service provider 1012 can make payroll payments to employee(s) on behalf of an employer via the payroll service. For instance, the service provider 1012 can facilitate the transfer of a total amount to be paid out for the payroll of an employee from the bank of the employer to the bank of the service provider 1012 to be used to make payroll payments. In at least one example, when the funds have been received at the bank of the service provider 1012, the service provider 1012 can pay the employee, such as by check or direct deposit, often a day, a week, or more after when the work was actually performed by the employee. In additional or alternative examples, the service provider 1012 can enable employee(s) to receive payments via same-day or instant deposit based at least in part on risk and/or reliability analyses performed by the service provider 1012.

Moreover, in at least one example, the service provider 1012 can provide employee management services for managing schedules of employees. Further, the service provider 1012 can provide appointment services for enabling users 1014 to set schedules for scheduling appointments and/or users 1014 to schedule appointments.

In some examples, the service provider 1012 can provide restaurant management services to enable users 1014 to make and/or manage reservations, to monitor front-of-house and/or back-of-house operations, and so on. In such examples, the merchant device(s) 1008 and/or server computing device(s) 1002 can be configured to communicate with one or more other computing devices, which can be located in the front-of-house (e.g., POS device(s)) and/or back-of-house (e.g., kitchen display system(s) (KDS)). In at least one example, the service provider 1012 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1012 can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider 1012.

The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1012 can receive requests for courier services, automatically assign the requests to active couriers, and communicate dispatch instructions to couriers via user interface (e.g., application, web browser, or other access point) presented via respective devices 1006.

In some examples, the service provider 1012 can provide omni-channel fulfillment services. For instance, if a buyer places an order with a merchant and the merchant cannot fulfill the order because one or more items are out of stock or otherwise unavailable, the service provider 1012 can leverage other merchants and/or sales channels that are part of the platform of the service provider 1012 to fulfill the buyer's order. That is, another merchant can provide the one or more items to fulfill the order of the buyer. Furthermore, in some examples, another sales channel (e.g., online, brick-and-mortar, etc.) can be used to fulfill the order of the buyer.

In some examples, the service provider 1012 can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider 1012 can utilize determined intents to automate buyer service, offer promotions, provide recommendations, or otherwise interact with buyers in real-time. In at least one example, the service provider 1012 can integrate products and services, and payment mechanisms into a communication platform (e.g., messaging, etc.) to enable buyers to make purchases, or otherwise transact, without having to call, email, or visit a web page or other channel of a merchant. That is, conversational commerce alleviates the need for buyers to toggle back and forth between conversations and web pages to gather information and make purchases.

In at least one example, the service provider 1012 can provide a peer-to-peer payment service that enables peer-to-peer payments between two or more users 1014. In at least one example, the service provider 1012 can communicate with instances of a payment application (or other access point) installed on devices 1006 configured for operation by users 1014. In an example, an instance of the payment application executing on a first device operated by a payor can send a request to the service provider 1012 to transfer an amount of funds (e.g., fiat currency or non-fiat currency such as cryptocurrency, securities, and related assets) from an account of the payor to an account of a payee (e.g., a peer-to-peer payment). The service provider 1012 can facilitate the transfer and can send a notification to an instance of the payment application executing on a second mobile device operated by the payee that the transfer is in process (or has been completed). In some examples, the service provider 1012 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1012 funds the request to payee on behalf of the payor, to speed up the transfer process and compensate for any lags that may be attributed to payor's financial network.

In some implementations, the service provider 1012 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (E), rupee (Z), yuan (v), etc. Although use of the dollar currency indicator ($) is used herein, it is to be understood that any currency symbol could equally be used. The peer-to-peer process can be initiated through a particular application executing on the user devices 1006.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1012. For instance, the service provider 1012 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server computing device(s) 1002 (which, in such an example can be called a "messaging server"). In some instances, the messaging application can include a payment application with messaging capability that enables users of the payment application to communicate with one another. In such instances, the payment application can be executed on the user device 1006 based on instructions transmitted to and from the server computing device(s) 1002 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1012 can create the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1014 may be new to the service provider 1012 such that the user 1014 that has not registered (e.g., subscribed to receive access to one or more services offered by the service provider) with the service provider 1012. The service provider 1012 can offer onboarding services for registering a potential user 1014 with the service provider 1012. In some examples, onboarding can involve presenting various questions, prompts, and the like to a potential user 1014 to obtain information that can be used to create a profile for the potential user 1014. In at least one example, the service provider 1012 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider 1012. In such an example, any limited or short-term access to services of the service provider 1012 can be transitioned to more permissive (e.g., less limited) or longer-term access to such services.

The service provider 1012 can be associated with IDV services, which can be used by the service provider 1012 for compliance purposes and/or can be offered as a service, for instance to third-party service providers (e.g., associated with the server computing device(s) 1010). That is, the service provider 1012 can offer IDV services to verify the identity of users 1014 seeking to use or using their services. Identity verification requires a buyer (or potential buyer) to provide information that is used by compliance departments to prove that the information is associated with an identity of a real person or entity. In at least one example, the service provider 1012 can perform services for determining whether identifying information provided by a user 1014 accurately identifies the buyer (or potential buyer) (i.e., Is the buyer who they say they are?).

The service provider 1012 can provide cryptocurrency management and/or custodial services, optionally in combination with the peer-to-peer payment service described above. For example, service provider 1012 can manage a cryptocurrency wallet holding a cryptocurrency balance on behalf of users, or can interoperate with cryptocurrency wallets implemented on merchant device 1008(A) and/or reader device 1022. Such interoperation can include helping to present transactions to such wallets, facilitating transactions sent from such wallets, storing and/or assisting users with recovering cryptographic material needed to use such wallets, and so on.

The service provider 1012 is capable of providing additional or alternative services and the services described above are offered as a sampling of services. In at least one example, the service provider 1012 can exchange data with the server computing device(s) 1010 associated with third-party service providers. Such third-party service providers can provide information that enables the service provider 1012 to provide services, such as those described above. In additional or alternative examples, such third-party service providers can access services of the service provider 1012. That is, in some examples, the third-party service providers can be subscribers, or otherwise access, services of the service provider 1012.

Techniques described herein can be configured to operate in both real-time/online and offline modes. "Online" modes refer to modes when devices are capable of communicating with the service provider 1012 (e.g., the server computing device(s) 1002) and/or the server computing device(s) 1010 via the network(s) 1004. In some examples, the merchant device(s) 1008 are not capable of connecting with the service provider 1012 (e.g., the server computing device(s) 1002) and/or the server computing device(s) 1010, due to a network connectivity issue, for example. In additional or alternative examples, the server computing device(s) 1002 are not capable of communicating with the server computing device(s) 1010 due to network connectivity issue, for example. In such examples, devices may operate in "offline" mode where at least some payment data is stored (e.g., on the merchant device(s) 1008) and/or the server computing device(s) 1002 until connectivity is restored and the payment data can be transmitted to the server computing device(s) 1002 and/or the server computing device(s) 1010 for processing.

In at least one example, the service provider 1012 can be associated with a hub, such as an order hub, an inventory hub, a fulfillment hub and so on, which can enable integration with one or more additional service providers (e.g., associated with the additional server computing device(s) 1010). In some examples, such additional service providers can offer additional or alternative services and the service provider 1012 can provide an interface or other computer-readable instructions to integrate functionality of the service provider 1012 into the one or more additional service providers.

Techniques described herein are directed to services provided via a distributed system of user devices 1006 that are in communication with one or more server computing devices 1002 of the service provider 1012. That is, techniques described herein are directed to a specific implementation—or, a practical application—of utilizing a distributed system of user devices 1006 that are in communication with one or more server computing devices 1002 of the service provider 1012 to perform a variety of services, as described above. The unconventional configuration of the distributed system described herein enables the server computing device(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1012, and those outside of the control of the service provider 1012, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
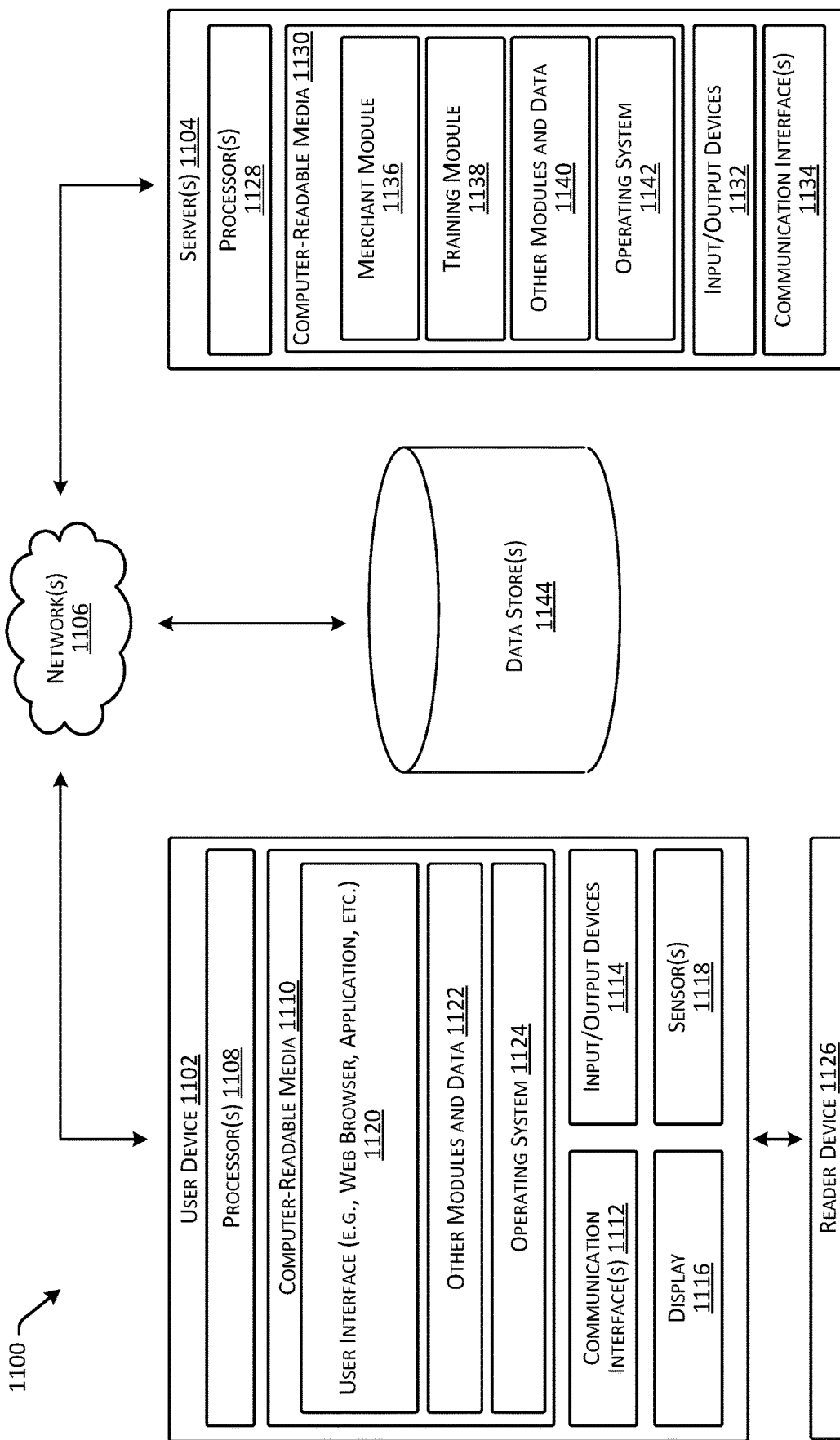
FIG. 11 illustrates additional details associated with individual components of the merchant ecosystem described above in FIG. 10.

FIG. 11 depicts an illustrative block diagram illustrating a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 10.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, modules or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 and/or other networked devices. In at least one example, the user interface 1120 can be presented via a web browser, or the like. In other examples, the user interface 1120 can be presented via an application, such as a mobile application or desktop application, which can be provided by a service provider 1012 associated with the server(s) 1104, or which can be an otherwise dedicated application. In some examples, the user interface 1120 can be one of the user interface(s) 124 described above with reference to FIG. 1. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

Depending on the type of the user device 1102, the computer-readable media 1110 can also optionally include other functional components and data, such as other modules and data 1122, which can include programs, drivers, etc., and the data used or created by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 can include sensor(s) 1118. The sensor(s) 1118 can include a GPS device able to indicate location information. Further, the sensor(s) 1118 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider 1012, described above, to provide one or more services. That is, in some examples, the service provider 1012 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1014 and/or for sending users 1014 notifications regarding available appointments with merchant(s) located proximate to the users 1014. In at least one example, location can be used for taking payments from nearby buyers when they leave a geofence, or location can be used to initiate an action responsive to users 1014 enter a brick-and-mortar store of a merchant. Location can be used in additional or alternative ways as well.

Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126, for reading payment instruments and/or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 can include a read head for reading a magnetic strip of a payment card, and further can include encryption technology for encrypting the information read from the magnetic strip. Additionally, or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally, or optionally, the reader device 1126 may also include a biometric sensor to receive and process biometric characteristics and process them as payment instruments, given that such biometric characteristics are registered with the payment processing service provider and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more modules and/or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one module for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control a clock, which may provide a clock signal indicating a time. Furthermore, the reader chip may perform functionality to control the network interface, which may interface with the network(s) 1106, as described below.

Additionally, the reader chip may perform functionality to control the power supply. The power supply may include one or more power supplies such as a physical connection to AC power or a battery. Power supply may include power conversion circuitry for converting AC power and creating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102. In some instance, the user device 1102 and/or the reader device can implement cryptocurrency wallets, as described above. Again, such interoperation can include helping to present transactions to such wallets, facilitating transactions sent from such wallets, storing and/or assisting users with recovering cryptographic material needed to use such wallets, and so on.

The server(s) 1104 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise or can be provided by the servers and/or services of multiple different buyers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units and can include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory and/or removable and non-removable media implemented in any type of technology for storage of information, such as computer-readable instructions, data structures, program modules, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider 1012 and/or payment processing service. Functional components stored in the computer-readable media 1130 can optionally include a merchant module 1136, a training module 1138, and one or more other modules and data 1140.

The merchant module 1136 can be configured to receive transaction data from POS systems, such as the POS system 1024 described above with reference to FIG. 10. The merchant module 1136 can transmit requests (e.g., authorization, capture, settlement, etc.) to payment service server computing device(s) to facilitate POS transactions between merchants and buyers. The merchant module 1136 can communicate the successes or failures of the POS transactions to the POS systems. The payment processing component 128 described above with reference to FIG. 1 can correspond to the merchant module 1136.

The training module 1138 can be configured to train models using machine-learning mechanisms. For example, a machine-learning mechanism can analyze training data to train a data model that creates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store(s) associated with the user device(s) 1102 and/or the server(s) 1104 for use at a time after the data models have been trained (e.g., at runtime).

The one or more other modules and data 1140 can include programs, drivers, etc., and the data used or created by the functional components. Further, the server(s) 1104 can include many other logical, programmatic and physical components, of which those described above are merely examples that are related to the discussion herein.

The one or more "modules" and/or "components" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they may create useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. The API(s), described above, can correspond to such.

The computer-readable media 1130 can additionally include an operating system 1142 for controlling and managing various functions of the server(s) 1104.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include data store(s) 1144 that can be configured to store data that is accessible, manageable, and updatable. In some examples, the data store(s) 1144 can be integrated with the user device 1102 and/or the server(s) 1104. In other examples, as shown in FIG. 11, the data store(s) 1144 can be located remotely from the server(s) 1104 and can be accessible to the server(s) 1104. The data store(s) 1144 can comprise multiple databases and/or servers connected locally and/or remotely via the network(s) 1106. The data store(s) 156, described above with reference to FIG. 1, can correspond to the data store(s) 1144.

In at least one example, the data store(s) 1144 can store user profiles, which can include merchant profiles, buyer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The merchant profile can securely store bank account information as provided by the merchant. Further, the merchant profile can store payment information associated with a payment instrument linked to a stored balance of the merchant, such as a stored balance maintained in a ledger by the service provider 1012.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s), described above with reference to FIG. 1, can include or be associated with the merchant profiles and/or buyer profiles described above.

Furthermore, in at least one example, the data store(s) 1144 can store inventory database(s) and/or catalog database(s). As described above, an inventory can store data associated with a quantity of each item that a merchant has available to the merchant. The records described above can be stored in the inventory data store. Furthermore, a catalog can store data associated with items that a merchant has available for acquisition. The data store(s) 1144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 2A-6B for convenience and ease of understanding. However, the methods illustrated are not limited to being performed using components described in FIGS. 1, 7, and 8, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:
   receiving, by one or more servers of a payment service and from a point-of-sale (POS) device of a seller, first data identifying a payment reader, wherein the first data comprises first image data associated with visual indicia printed on one or more surfaces of the payment reader;
   identifying, by the one or more servers, the payment reader using the first data received from the POS device;
   based at least in part on pairing data stored a database associated with the payment service, determining, by the one or more servers, that the payment reader is not paired;
   generating, by the one or more servers, first instructions for associating the POS device with the payment reader via a pairing handshake over a short-range wireless network;
   sending, by the one or more servers and to the POS device and at a first time, the first instructions;
   updating, by the one or more servers, the pairing data to updated pairing data, wherein the updated pairing data indicates the pairing of the POS device to the payment reader, and wherein the payment reader is in a connected-sleep power state responsive to the pairing;
   receiving, by the one or more servers and from a buyer device of a buyer, second data identifying the payment reader, wherein the second data comprises second image data associated with the visual indicia;
   identifying, by the one or more servers, the payment reader using the second data received from the buyer device;
   based at least in part on the updated pairing data, determining, by the one or more servers, that the payment reader is associated with the POS device; and
   based on determining, by the one or more servers, that the payment reader is associated with the POS device:
   causing, by the one or more servers, transitioning of the payment reader from the connected-sleep power state to a ready-for-payment power state, wherein the ready-for-payment power state consumes more power than the connected-sleep power state, and wherein payment via the payment reader requires being in the ready-for-payment power state; and
   sending, by the one or more servers and to the buyer device at a second time, second instructions for facilitating a payment transaction between the buyer device and the POS device via the payment reader without sending the POS device any instructions for associating the POS device with the payment reader at the second time.

2. The method as recited in claim 1, wherein the determining that the payment reader is not paired comprises determining that the payment reader is not wirelessly paired to a device over the short-range wireless network.

3. The method as recited in claim 1, wherein:
   the first data is generated by the POS device using an imaging device of the POS device; and
   the second data is generated by the buyer device using an imaging device of the buyer device.

4. The method as recited in claim 1, wherein the visual indicia comprises at least one of a quick-response (QR) code, a bar code, an image, or an alphanumeric character string.

5. The method as recited in claim 1, wherein:
   the sending the first instructions to the POS device comprises sending the first instructions to the POS device at least partly in response to determining that the payment reader is not paired.

6. The method as recited in claim 1, wherein the sending the second instructions comprises sending the second instructions to cause the buyer device to output instruction data instructing a user to at least one of (i) tap the buyer device or a payment instrument to the payment reader to make a payment, or (ii) insert or swipe the payment instrument to the payment reader to make a payment.

7. The method as recited in claim 1, wherein the sending the second instructions comprises sending the second instructions to cause the buyer device to enter an online payment flow for making a payment.

8. A system comprising:
one or more processors; and
one or more computer-readable media storing computer-executable instructions that, when executed, cause the one or more processors to perform acts comprising:
receiving, by one or more servers of a payment service and from a first electronic device, first data identifying a payment reader, wherein the first data comprises first image data associated with visual indicia printed on one or more surfaces of the payment reader;
identifying, by the one or more servers, the payment reader using the first data received from the first electronic device;
based at least in part on pairing data stored a database associated with the payment service, determining, by the one or more servers, that the payment reader is not paired;
generating, by the one or more servers, first instructions for associating the first electronic device with the payment reader via a pairing handshake over a short-range wireless network;
sending, by the one or more servers and to the first electronic device and at a first time, the first instructions;
updating, by the one or more servers, the pairing data to updated pairing data, wherein the updated pairing data indicates the pairing of the first electronic device to the payment reader, and wherein the payment reader is in a connected-sleep power state responsive to the pairing;
receiving, by the one or more servers and from a second electronic device, second data identifying the payment reader, wherein the second data comprises second image data associated with the visual indicia;
identifying, by the one or more servers, the payment reader using the second data received from the second electronic device;
based at least in part on the updated pairing data, determining, by the one or more servers, that the payment reader is associated with the first electronic device; and
based on determining, by the one or more servers, that the payment reader is associated with the first electronic device:
causing, by the one or more servers, transitioning of the payment reader from the connected-sleep power state to a ready-for-payment power state, wherein the ready-for-payment power state consumes more power than the connected-sleep power state, and wherein payment via the payment reader requires being in the ready-for-payment power state; and
sending, by the one or more servers and to the second electronic device and at a second time, second instructions for facilitating a payment transaction between the second electronic device and the first electronic device via the payment reader without sending the first electronic device any instructions for associating the first electronic device with the payment reader at the second time.

9. The system as recited in claim 8, wherein the determining that the payment reader is not paired comprises determining that the payment reader is not wirelessly paired to a device over the short-range wireless network.

10. The system as recited in claim 8, wherein:
the first data is generated by the first electronic device using an imaging device of the first electronic device; and
the second data is generated by the second electronic device using an imaging device of the second electronic device.

11. The system as recited in claim 8, wherein:
the sending the first instructions to the first electronic device comprises sending the first instructions to the first electronic device at least partly in response to determining that the payment reader is not paired.

12. The system as recited in claim 8, wherein the sending the second instructions comprises sending the second instructions to cause the second electronic device to output instruction data instructing a user to tap the second electronic device or a payment instrument to the payment reader to make a payment.

13. The system as recited in claim 8, wherein the sending the second instructions comprises sending the second instructions to cause the second electronic device to output instruction data instructing a user to insert or swipe a payment instrument to the payment reader to make a payment.

14. The system as recited in claim 8, wherein the sending the second instructions comprises sending the second instructions to cause the second electronic device to enter an online payment flow for making a payment.

15. A method comprising:
receiving, by one or more servers of a payment service and from a first electronic device, a first indication of visual indicia printed on one or more surfaces of a wireless payment reader;
based at least in part on the first indication of the visual indicia and on pairing data stored a database associated with the payment service, determining, by the one or more servers, that the wireless payment reader is not paired;
generating, by the one or more servers, first instructions for pairing the first electronic device with the wireless payment reader via a pairing handshake over a short-range wireless network;
sending, by the one or more servers and to the first electronic device, the first instructions;
updating, by the one or more servers, the pairing data to updated pairing data, wherein the updated pairing data indicates the pairing of the first electronic device to the wireless payment reader, and wherein the wireless payment reader is in a connected-sleep power state responsive to the pairing;
receiving, by the one or more servers and from a second electronic device, a second indication of the visual indicia;
based at least in part on the second indication of the visual indicia printed on the one or more surfaces of the wireless payment reader, identifying, by the one or more servers, the wireless payment reader;
based at least in part on the updated pairing data, determining, by the one or more servers, that the wireless payment reader is paired with the first electronic device; and
based on determining, by the one or more servers, that the wireless payment reader is associated with the first electronic device:
causing, by the one or more servers, transitioning of the wireless payment reader from the connected-sleep power state to a ready-for-payment power state, wherein the ready-for-payment power state consumes more power than the connected-sleep power state, and wherein payment via the wireless payment reader requires being in the ready-for-payment power state; and sending, by the one or more servers and to the second electronic device and at a second time, second instructions for facilitating a payment transaction between the first electronic device and the second electronic device via the wireless payment reader without sending the first electronic device any instructions for associating the first electronic device with the wireless payment reader at the second time.

16. The method as recited in claim 15, wherein the second instructions cause the second electronic device to output instruction data instructing a user to tap the second electronic device or a payment instrument to the wireless payment reader to make a payment.

17. The method as recited in claim 1,
wherein determining that the payment reader is not paired comprises determining that the payment reader is not paired with a device.

18. The method as recited in claim 1, further comprising:
determining whether the first data was received via a POS application executing on the POS device;
at least partly in response to determining that the first data was not received via the POS application, including installation instructions in the first instructions, wherein the installation instructions cause the POS device to install the POS application; and
at least partly in response to determining that the first data was received from the POS application, sending the first instructions free from the installation instructions.

19. The method as recited in claim 15, wherein:
the first indication of the visual indicia is generated by the first electronic device using an imaging device of the first electronic device; and
the second indication of the visual indicia is generated by the second electronic device using an imaging device of the second electronic device.

20. The method as recited in claim 15, wherein the visual indicia comprises at least one of a quick-response (QR) code, a bar code, an image, or an alphanumeric character string.

* * * * *